(12) United States Patent
Low et al.

(10) Patent No.: US 11,336,175 B2
(45) Date of Patent: May 17, 2022

(54) CHARGE BALANCED CHARGE PUMP CONTROL

(71) Applicant: pSemi Corporation, San Diego, CA (US)

(72) Inventors: Aichen Low, Cambridge, MA (US); Gregory Szczeszynski, Hollis, NH (US); David Giuliano, Bedford, NH (US)

(73) Assignee: pSemi Corporation, San Diego, CA (US)

( * ) Notice: Subject to any disclaimer, the term of this patent is extended or adjusted under 35 U.S.C. 154(b) by 0 days.

(21) Appl. No.: 16/744,606

(22) Filed: Jan. 16, 2020

(65) Prior Publication Data
US 2020/0228002 A1 Jul. 16, 2020

Related U.S. Application Data

(63) Continuation of application No. 16/506,252, filed on Jul. 9, 2019, now Pat. No. 10,574,140, which is a (Continued)

(51) Int. Cl.
*H02M 3/07* (2006.01)
*H02M 1/00* (2006.01)

(52) U.S. Cl.
CPC ............ *H02M 3/07* (2013.01); *H02M 1/0048* (2021.05); *Y02B 70/10* (2013.01)

(58) Field of Classification Search
None
See application file for complete search history.

(56) References Cited

U.S. PATENT DOCUMENTS

| 4,214,174 A | 7/1980 | Dickson |
| 4,812,961 A | 3/1989 | Essaff |

(Continued)

FOREIGN PATENT DOCUMENTS

| CN | 106105001 A | 11/2016 |
| CN | 106105001 B | 7/2019 |

(Continued)

OTHER PUBLICATIONS

Abutbul et al. "Step-Up Switching-Mode Converter With High Voltage Gain Using a Switched-Capacitor Circuit" *IEEE Transactions on Circuits and Systems I.*, vol. 50, pp. 1098-1102, Aug. 2003.

(Continued)

*Primary Examiner* — Thomas J. Hiltunen
*Assistant Examiner* — Khareem E Almo
(74) *Attorney, Agent, or Firm* — Finnegan, Henderson, Farabow, Garrett & Dunner, LLP

(57) ABSTRACT

Operating a charge pump in which switches from a first set of switches couple capacitor terminals to permit charge transfer between them and in which switches from a second set of switches couple capacitor terminals of capacitors to either a high-voltage or a low-voltage terminal includes cycling the switches through a sequence of states, each state defining a corresponding configuration of the switches. At least three of the states define different configurations of the switches. During each of the configurations, charge transfer is permitted between a pair of elements, one of which is a first capacitor and another of which is either a second capacitor or the first terminal.

21 Claims, 12 Drawing Sheets

Related U.S. Application Data continuation of application No. 16/185,273, filed on Nov. 9, 2018, now Pat. No. 10,348,195, which is a continuation of application No. 15/126,050, filed as application No. PCT/US2015/019579 on Mar. 10, 2015, now Pat. No. 10,128,745.

(60) Provisional application No. 61/953,270, filed on Mar. 14, 2014.

(56) References Cited

U.S. PATENT DOCUMENTS

| | | | |
|---|---|---|---|
| 5,132,606 | A | 7/1992 | Herbert |
| 5,301,097 | A | 4/1994 | Mcdaniel |
| 5,737,201 | A | 4/1998 | Meynard |
| 5,761,058 | A | 6/1998 | Kanda |
| 5,801,987 | A | 9/1998 | Dinh |
| 5,907,484 | A | 5/1999 | Kowshik |
| 5,978,283 | A | 11/1999 | Hsu |
| 6,107,864 | A | 8/2000 | Fukushima |
| 6,476,666 | B1 | 11/2002 | Palusa |
| 6,486,728 | B2 | 11/2002 | Kleveland |
| 6,501,325 | B1 | 12/2002 | Meng |
| 6,504,422 | B1 | 1/2003 | Rader |
| 6,759,766 | B2 | 7/2004 | Hiratsuka |
| 6,927,441 | B2 | 8/2005 | Pappalardo |
| 6,980,181 | B2 | 12/2005 | Sudo |
| 7,145,382 | B2 | 12/2006 | Ker |
| 7,190,210 | B2 | 3/2007 | Azrai |
| 7,224,062 | B2 | 5/2007 | Hsu |
| 7,239,194 | B2 | 7/2007 | Azrai |
| 7,250,810 | B1 | 7/2007 | Tsen |
| 7,408,330 | B2 | 8/2008 | Zhao |
| 7,511,978 | B2 | 3/2009 | Chen |
| 7,595,682 | B2 | 9/2009 | Lin |
| 7,724,551 | B2 | 5/2010 | Yanagida |
| 7,777,459 | B2 | 8/2010 | Williams |
| 7,782,027 | B2 | 8/2010 | Williams |
| 7,786,712 | B2 | 8/2010 | Williams |
| 7,807,499 | B2 | 10/2010 | Nishizawa |
| 7,812,579 | B2 | 10/2010 | Williams |
| 7,928,705 | B2 | 4/2011 | Hooijschuur |
| 7,999,601 | B2 | 8/2011 | Schlueter |
| 8,018,216 | B2 | 9/2011 | Kakehi |
| 8,040,174 | B2 | 10/2011 | Likhterov |
| 8,048,766 | B2 | 11/2011 | Joly |
| 8,111,054 | B2 | 2/2012 | Yen |
| 8,120,934 | B2 * | 2/2012 | Pauritsch ............... H02M 3/07 363/60 |
| 8,159,091 | B2 | 4/2012 | Yeates |
| 8,193,604 | B2 | 6/2012 | Lin |
| 8,212,541 | B2 | 7/2012 | Perreault |
| 8,339,184 | B2 | 12/2012 | Kok |
| 8,350,549 | B2 | 1/2013 | Kitabatake |
| 8,354,828 | B2 | 1/2013 | Huang |
| 8,384,467 | B1 | 2/2013 | O'Keeffe |
| 8,395,914 | B2 | 3/2013 | Klootwijk |
| 8,456,874 | B2 | 6/2013 | Singer |
| 8,503,203 | B1 * | 8/2013 | Szczeszynski ........ H02M 3/073 327/356 |
| 8,643,347 | B2 | 2/2014 | Giuliano |
| 8,723,491 | B2 | 5/2014 | Giuliano |
| 8,803,492 | B2 | 8/2014 | Liu |
| 9,559,589 | B2 * | 1/2017 | Petersen ............... H05B 45/38 |
| 10,128,745 | B2 | 11/2018 | Low |
| 10,348,195 | B2 | 7/2019 | Low |
| 10,574,140 | B2 | 2/2020 | Low |
| 2002/0008567 | A1 | 1/2002 | Henry |
| 2003/0169096 | A1 | 9/2003 | Hsu |
| 2003/0227280 | A1 | 12/2003 | Vinciarelli |
| 2004/0041620 | A1 | 3/2004 | D'Angelo |
| 2005/0007184 | A1 | 1/2005 | Kamijo |
| 2005/0207133 | A1 | 9/2005 | Pavier |
| 2007/0210774 | A1 | 9/2007 | Kimura |
| 2007/0230221 | A1 | 10/2007 | Lim |
| 2008/0150621 | A1 | 6/2008 | Lesso |
| 2008/0157732 | A1 | 7/2008 | Williams |
| 2008/0157733 | A1 | 7/2008 | Williams |
| 2008/0158915 | A1 | 7/2008 | Williams |
| 2008/0239772 | A1 | 10/2008 | Oraw |
| 2008/0284398 | A1 | 11/2008 | Qiu |
| 2009/0059630 | A1 | 3/2009 | Williams |
| 2009/0102439 | A1 | 4/2009 | Williams |
| 2009/0174383 | A1 | 7/2009 | Tsui |
| 2009/0257211 | A1 | 10/2009 | Kontani |
| 2009/0278520 | A1 | 11/2009 | Perreault |
| 2009/0322414 | A1 * | 12/2009 | Oraw ..................... H02M 3/07 327/537 |
| 2010/0110741 | A1 | 5/2010 | Lin |
| 2010/0140736 | A1 | 6/2010 | Lin |
| 2010/0202161 | A1 | 8/2010 | Sims |
| 2010/0214746 | A1 | 8/2010 | Lotfi |
| 2010/0244189 | A1 | 9/2010 | Klootwijk |
| 2010/0244585 | A1 | 9/2010 | Tan |
| 2011/0026275 | A1 | 2/2011 | Huang |
| 2011/0163414 | A1 | 7/2011 | Lin |
| 2011/0204858 | A1 | 8/2011 | Kudo |
| 2011/0204959 | A1 * | 8/2011 | Sousa ..................... H02M 3/07 327/536 |
| 2012/0119718 | A1 | 5/2012 | Song |
| 2012/0139515 | A1 | 6/2012 | Li |
| 2012/0146177 | A1 | 6/2012 | Choi |
| 2012/0153907 | A1 | 6/2012 | Carobolante |
| 2012/0170334 | A1 * | 7/2012 | Menegoli ............... H02M 3/07 363/60 |
| 2012/0313602 | A1 | 12/2012 | Perreault |
| 2012/0326684 | A1 | 12/2012 | Perreault |
| 2013/0049714 | A1 | 2/2013 | Chiu |
| 2013/0069614 | A1 | 3/2013 | Tso |
| 2013/0094157 | A1 | 4/2013 | Giuliano |
| 2013/0154600 | A1 | 6/2013 | Giuliano |
| 2013/0229841 | A1 * | 9/2013 | Giuliano ............... H02M 3/158 363/60 |
| 2014/0070787 | A1 * | 3/2014 | Arno ..................... H02M 3/02 323/304 |
| 2014/0152388 | A1 * | 6/2014 | Lesso ................... H03G 1/0029 327/536 |
| 2014/0159681 | A1 | 6/2014 | Oraw |
| 2014/0340158 | A1 * | 11/2014 | Thandri ................. H03F 3/005 330/297 |
| 2016/0197552 | A1 * | 7/2016 | Giuliano ............... H02M 7/25 363/60 |
| 2017/0085172 | A1 * | 3/2017 | Low ....................... H02M 3/07 |
| 2017/0244318 | A1 * | 8/2017 | Giuliano ............. H02M 3/1582 |
| 2019/0081561 | A1 | 3/2019 | Low |
| 2020/0007033 | A1 | 1/2020 | Low |

FOREIGN PATENT DOCUMENTS

| | | |
|---|---|---|
| DE | 112015001245 T5 | 12/2016 |
| EP | 0773622 | 5/1997 |
| GB | 2538664 | 11/2016 |
| JP | 10327573 | 12/1998 |
| JP | H10327573 | 12/1998 |
| JP | 11235053 | 8/1999 |
| JP | H11235053 | 8/1999 |
| JP | 2006067783 | 3/2006 |
| JP | 2010045943 | 2/2010 |
| KR | 20110061121 | 6/2011 |
| KR | 20160132973 | 11/2016 |
| TW | 201603463 | 1/2016 |
| WO | 2006093600 | 9/2006 |
| WO | WO2006093600 | 9/2006 |
| WO | 2009112900 | 9/2009 |
| WO | WO2009112900 | 9/2009 |
| WO | 2012151466 | 11/2012 |
| WO | WO2012151466 | 11/2012 |
| WO | 2013059446 | 4/2013 |
| WO | WO2013059446 | 4/2013 |
| WO | 2013096416 | 6/2013 |

(56) References Cited

FOREIGN PATENT DOCUMENTS

| WO | WO2013096416 | 6/2013 |
|---|---|---|
| WO | WO2015138378 | 9/2015 |

OTHER PUBLICATIONS

Axelrod et al. "Single-switch single-stage switched-capacitor buck converter", *Proc. of NORPIE 2004, 4th Nordic Workshop on Power and Industrial Electronics*, Jun. 2004.

Cervera et al. "A High Efficiency Resonant Switched Capacitor Converter with Continuous Conversion Ratio," Energy Conversion Congress and Exposition (ECCE), Sep. 2013, pp. 4969-4976.

Han et al. "A New Approach to Reducing Output Ripple in Switched-Capacitor-Based Step-Down DC-DC Converters" *IEEE Transactions on Power Electronics*, vol. 21, No. 6, pp. 1548-1555 Nov. 2006.

Lei et al. "Analysis of Switched-capacitor DC-DC Converters in Soft-charging Operation" *14th IEEE Workshop on Control and Modeling for Power Electronics*, pp. 1-7, Jun. 23, 2013.

Linear Technology data sheet for part LTC3402, "2A, 3MHz Micropower Synchronous Boost Converter," 2000.

Ma et al., "Design and Optimization of Dynamic Power System for Self-Powered Integrated Wireless Sensing Nodes" ACM ISLPED '05 conference (published at pp. 303-306 of the proceedings).

Markowski, "Performance Limits of Switched-Capacitor DC-DC Converters", IEEE PESC'95 Conference, 1995.

Meynard et al. "Multi-Level Conversion: High Voltage Choppers and Voltage-Source Inverters," IEEE Power Electronics Specialists Conference, pp. 397-403, 1992.

Middlebrook, "Transformerless DC-to-DC Converters with Large Conversion Ratios" *IEEE Transactions on Power Electronics*, vol. 3, No. 4, pp. 484-488, Oct. 1988.

Ng et al. "Switched Capacitor DC-DC Converter: Superior where the Buck Converter has Dominated" *PhD Thesis, UC Berkeley*, Aug. 17, 2011.

Ottman et al, "Optimized Piezoelectric Energy Harvesting Circuit using Step-Down Converter in Discontinuous Conduction Mode," IEEE Power Electronics Specialists Conference, pp. 1988-1994, 2002.

Pilawa-Podgurski et al. "Merged Two-Stage Power Converter Architecture with Soft Charging Switched-Capacitor Energy Transfer" *39th IEEE Power Electronics Specialists Conference*, 2008.

Pilawa-Podgurski et al. "Merged Two-Stage Power Converter with Soft Charging Switched-Capacitor Stage in 180 nm CMOS," *IEEE Journal of Solid-State Circuits*, vol. 47, No. 7, pp. 1557-1567, Jul. 2012.

Starzyk et al., "A DC-DC Charge Pump Design Based on Voltage Doublers," IEEE Transactions on Circuits and Systems—I: Fundamental Theory and Applications, vol. 48, No. 3, Mar. 2001, pp. 350-359.

Sun et al. "High Power Density, High Efficiency System Two-Stage Power Architecture for Laptop Computers", *Power Electronics Specialists Conference*, pp. 1-7, Jun. 2006.

Texas Instruments data sheet for part TPS54310, "3-V to 6-V input, 3-A output synchronous-buck PWM switcher with integrated FETs", dated 2002-2005.

Umeno et al. "A New Approach to Low Ripple-Noise Switching Converters on the Basis of Switched-Capacitor Converters" *IEEE International Symposium on Circuits and Systems*, vol. 2, pp. 1077-1080, Jun. 1991.

Wood et al. "Design, Fabrication and Initial Results of a 2g Autonomous Glider" *IEEE Industrial Electronics Society*, pp. 1870-1877, Nov. 2005.

Xu et al., "Voltage Divider and its Application in Two-stage Power Architecture," IEEE Twenty-First Annual IEEE Applied Power Electronics Conference and Exposition, pp. 499-504, Mar. 2006.

Linear Technology data sheet for part LTC3402, "2A, 3MHz Micropower Synchronoous Boost Converter," 2000, 16 pages, Doc 2071.

MA—"Design and Optimization on Dynamic Power System for Self-Powered Integrated Wireless Sensing Nodes" ACM ISLPED Aug. 2005, pp. 303-306, Doc 2072.

Makowski—"Performance Limits of Switched-Capacitor DC-DC Converters," IEEE PESC, Jun. 18-22, 1995, pp. 1215-1221, Doc 2073.

Middlebrook—"Transformerless DC-to-DC Converters with Large Conversion Ratios," IEEE Transactions on Power Electronics, vol. 3, Issue 4, pp. 484-488, Doc 2074.

NG—"Switched Capacitor DC-DC Converter: Superior where the Buck Converter has Dominated," PhD Thesis, UC Berkeley, Aug. 17, 2011, 141 pages, Doc 2075.

Pilawa-Podgurski—"Merged Two-Stage Power Converter with Soft Charging Switched-Capacitor Stage in 180 nm CMOS," IEEE Journal of Solid-State Circuits, vol. 47, No. 7, pp. 1557-1567, Jul. 2012, Doc 2076.

Texas Instruments data sheet for part TPS54310—"3-V to 6-V Input, 3-A Output Synchronous-Buck PWM Switcher With Integrated FETs," Dec. 2001, 28 pages, Doc 2077.

Wood—"Design, Fabrication and Initial Results of a 2g Autonomous Glider," IEEE Industrial Electronics Society, pp. 1870-1877, Nov. 2005, Doc 2078.

U.S. Appl. No. 15/126,050 / : Patent Application filed Sep. 14, 2016, 190 pages, Doc 2003.

U.S. Appl. No. 15/126,050 / : Filing Receipt dated Dec. 15, 2016, 5 pages, Doc 2004.

U.S. Appl. No. 15/126,050 / : Notice of Acceptance of Application dated Dec. 15, 2016, 2 pages, Doc 2005.

U.S. Appl. No. 15/126,050 / : Notice of Publication dated Mar. 23, 2017, 1 page, Doc 2017.

U.S. Appl. No. 15/126,050 / : Notification of Loss of Small Entity Status dated Oct. 4, 2017, 1 page, Doc 2018.

U.S. Appl. No. 15/126,050 / : Change of Assignee filed Oct. 5, 2017, 17 pages, Doc 2010.

U.S. Appl. No. 15/126,050 / : Corrected Filing Receipt dated Oct. 11, 2017, 4 pages, Doc 2006.

U.S. Appl. No. 15/126,050 / : List of References Considered by Examiner Nov. 27, 2017, 6 page, Doc 2015.

U.S. Appl. No. 15/126,050 / : Non-Final Office Action dated Oct. 24, 2018, 21 pages, Doc 2016.

U.S. Appl. No. 15/126,050 / : Request for Corrected Filing Receipt filed Feb. 28, 2018, 12 pages, Doc 2020.

U.S. Appl. No. 15/126,050 / : Response to Non-Final Office Action dated May 1, 2018, 15 pages, Doc 2007.

U.S. Appl. No. 15/126,050 / : Notice of Allowance dated Jul. 18, 2018, 16 pages, Doc 2008.

U.S. Appl. No. 15/126,050 / : Corrected Filing Receipt dated Jul. 27, 2018, 3 page, Doc 2011.

U.S. Appl. No. 15/126,050 / : Corrected Filing Receipt dated Aug. 8, 2018, 3 pages, Doc 2012.

U.S. Appl. No. 15/126,050 / : Issue Fee Payment filed Oct. 9, 2018, 6 pages, Doc 2013.

U.S. Appl. No. 15/126,050 / : Issue Notification dated Oct. 24, 2018, 1 page, Doc 2014.

U.S. Appl. No. 15/126,050 / : Power of Attorney and 3.73 filed Jan. 4, 2019, 5 pages, Doc 2019.

U.S. Appl. No. 15/126,050 / : Notice of Acceptance of Power of Attorney dated Jan. 9, 2019, 1 page, Doc 2009.

U.S. Appl. No. 15/126,050 / : Request for Corrected Filing Receipt dated Aug. 1, 2018, 21 pages, Doc 2020.

U.S. Appl. No. 15/126,050 / : Issue Classification dated Oct. 12, 2020, 2 pages, Doc 2021.

U.S. Appl. No. 16/185,273 / : Patent Application filed Nov. 9, 2018, 79 pages, Doc 2034.

U.S. Appl. No. 16/185,273 / : Filing Receipt dated Dec. 4, 2018, 4 pages, Doc 2035.

U.S. Appl. No. 16/185,273 / : Power of Attorney and 3.73 filed Jan. 4, 2019, 5 pages, Doc 2039.

U.S. Appl. No. 16/185,273 / : Acceptance of Power of Attorney dated Jan. 9, 2019, 1 page, Doc 2036.

U.S. Appl. No. 16/185,273 / : Notice of Allowance dated Feb. 26, 2019, 24 pages, Doc 2038.

(56) References Cited

OTHER PUBLICATIONS

U.S. Appl. No. 16/185,273 / : Notice of Publication dated Mar. 14, 2019, 1 page, Doc 2037.
U.S. Appl. No. 16/185,273 / : Issue Fee Payment filed May 24, 2019, 6 pages, Doc 2040.
U.S. Appl. No. 16/185,273 / : Issue Notification dated Jun. 19, 2019, 1 page, Doc 2041.
U.S. Appl. No. 16/506,252 / : Patent Application filed Jul. 9, 2019, 62 pages, Doc 2042.
U.S. Appl. No. 16/506,252 / : Patent Application dated Jul. 25, 2019, 4 pages, Doc 2043.
U.S. Appl. No. 16/506,252 / : Notice Regarding Power of Attorney dated Jul. 25, 2019, 1 page, Doc 2044.
U.S. Appl. No. 16/506,252 / : Improper Submission of Authorization to Permit Access dated Jul. 25, 2019, 2 pages, Doc 2045.
U.S. Appl. No. 16/506,252 / : Response to Notice to File Missing Parts filed Sep. 24, 2019, 26 pages, Doc 2046.
U.S. Appl. No. 16/506,252 / : Updated Filing Receipt dated Sep. 26, 2019, 6 pages, Doc 2047.
U.S. Appl. No. 16/506,252 / : Notice of Allowance dated Nov. 5, 2019, 25 pages, Doc 2049.
U.S. Appl. No. 16/506,252 / : Notice of Publication dated Jan. 2, 2020, 1 page, Doc 2048.
U.S. Appl. No. 16/506,252 / : Issue Fee Payment filed Jan. 15, 2020, 6 pages, Doc 2050.
U.S. Appl. No. 16/506,252 / : Issue Notification dated Feb. 5, 2020, 1 page, Doc 2051.
PCT/US2015/019579 / : Patent Application filed Mar. 10, 2015, 78 pages, Doc 2052.
PCT/US2015/019579 / : Notification of Application Number and Filing Date dated Mar. 17, 2015, 1 page, Doc 2055.
PCT/US2015/019579 / : Invitation to Correct Defects dated Mar. 17, 2015, 4 pages, Doc 2060.
PCT/US2015/019579 / : Response Invitation to Correct Defects filed Mar. 30, 2015, 7 pages, Doc 2061.
PCT/US2015/019579 / : International Search Report dated Jun. 19, 2015, 3 pages, Doc 2067.
PCT/US2015/019579 / : Written Opinion dated Jun. 19, 2015, 8 pages, Doc 2068.
PCT/US2015/019579 / : Amendment filed Aug. 18, 2015, 14 pages, Doc 2064.
PCT/US2015/019579 / : Notification Concerning Amendment to the Claims dated Aug. 21, 2015, 1 page, Doc 2065.
PCT/US2015/019579 / : Notice of Publication dated Sep. 17, 2015, 1 page, Doc 2054.
PCT/US2015/019579 / : International Preliminary Report on Patentability dated Jun. 28, 2016, 20 pages, Doc 2066.
PCT/US2015/019579 / : Request for Change under Rule 92bis filed Jul. 14, 2016, 2 pages, Doc 2062.
PCT/US2015/019579 / : Notification of the Recording of a Change dated Aug. 8, 2016, 1 page, Doc 2063.
CN201580014387.9 / : PCT Application Entry into Chinese National Phase dated Oct. 9, 2016, 39 pages, Doc 2079.
CN201580014387.9 / : Notification of the First Office Action dated May 3, 2018, 17 pages, Doc 2081.
CN201580014387.9 / : Notification of the Second Office Action dated Nov. 29, 2018, 8 pages, Doc 2082.
CN201580014387.9 / : Notice of Granted Patent dated Mar. 29, 2019, 4 pages, Doc 2083.
CN201580014387.9 / : Granted Patent Certificate dated Jul. 9, 2019, 4 pages, Doc 2084.
CN201580014387.9 / : Notice of Passing Examination on Formality dated Aug. 27, 2019, 3 pages, Doc 2080.
DE112015001245 / : DE Patent Application filed Sep. 20, 2016, 72 pages, Doc 2100.
DE112015001245 / : Publication of DE Patent Application dated Dec. 15, 2016, 30 pages, Doc 2099.
GB1615322.3 / : Electronic Filing Receipt dated Sep. 9, 2016, 1 page, Doc 2087.
GB1615322.3 / : Notice of Publication dated Oct. 24, 2016, 2 pages, Doc 2088.
GB1615322.3 / : Examination Report dated Sep. 11, 2020, 3 pages, Doc 2090.
GB2103320.4 / : Patent Application filed Mar. 10, 2021, 44 pages, Doc 2091.
GB2103320.4 / : Official Communication under Section 15(9) dated Apr. 23, 2021, 3 pages, Doc 2092.
GB2103320.4 / : Response to Official Communication under Section 15(9) dated Jul. 26, 2021, 3 pages, Doc 8104.
KR1020167028477 / : English Translation of KR Application filed Oct. 13, 2016, 3 pages, Doc 8106.
KR1020167028477 / : English Translation of Filing Receipt dated Oct. 13, 2016, 3 pages, Doc 2093.
KR1020167028477 / : Notice of Allowance dated Jul. 26, 2021, 6 pages, Doc 8105.
TW104108092 / : English Translation of TW Application filed Mar. 13, 2015 , 40 pages, Doc 2098.
TW104108092 / : Publication of application dated Jan. 16, 2016, 49 pages, Doc 2097.

\* cited by examiner

State 1a

State 1b

State 2

State 1a

State 1b

CHARGE BALANCED CHARGE PUMP CONTROL

RELATED APPLICATIONS

Under 35 USC 120 this application is a continuation of U.S. application Ser. No. 16/506,252, filed Jul. 9, 2019, which is a continuation of U.S. application Ser. No. 16/185,273, filed on Nov. 9, 2018, now U.S. Pat. No. 10,348,195, issued on Jul. 9, 2019, which is a continuation of U.S. application Ser. No. 15/126,050, filed on Sep. 14, 2016, now U.S. Pat. No. 10,128,745, issued on Nov. 13, 2018, which is the national phase under 35 USC 371 of International Application No. PCT/US2015/019579, filed on Mar. 10, 2015, which claims the benefit of the Mar. 14, 2014 priority date of U.S. Provisional Application 61/953,270, the contents of which are herein incorporated by reference.

FIELD OF INVENTION

This invention relates to control for charge pumps to balance charge.

BACKGROUND

Patent Publication WO 2012/151466, published on Nov. 8, 2012, and incorporated herein by reference, describes configurations of charge pumps, also known as switched capacitor converters, in which the source and/or load comprise regulating/regulator circuits. In some examples, the load can effectively comprise a current source and/or load rather than present a constant voltage in an example of what is referred to as "adiabatic" operation of a charge pump. Regulating/regulator circuits, such as switch-mode power converters, behave as current loads/sources. Therefore, current loads/sources and regulating/regulator circuits are interchangeable for the purpose of this disclosure.

Although use of a current-based load (and/or source) may improve efficiency as compared to a purely or substantially voltage-based load (and/or source), internal energy losses may remain, for example, due to redistribution of charges within the charge pump.

SUMMARY

One effect of using a current-based load (and/or source) with a charge pump is that there may be situations in which a conventional switch timing used with voltage-based loads and/or sources results in charge imbalance across capacitors, which can result in loss of efficiency, for example, due to charge redistribution immediately after switching between configurations in the charge pump.

In one aspect, in general, an approach to improving efficiency of a charge pump using adiabatic charge transfer makes use of three or more states, each corresponding to a configuration of switches coupling capacitors to one another and/or the input and output terminals of the charge pump. By introducing an appropriate sequence of more than two states in which charge is transferred to or from capacitors, and selecting the duration those states are occupied in each operating cycle of the charge pump, charge transfer in and out of each capacitor is balanced over the operating cycle, thereby avoiding or greatly reducing charge redistribution at state transitions and its associated power losses that lead to inefficiency.

In one aspect, the invention features an apparatus for coupling to capacitors to form a charge pump circuit. Such an apparatus includes a first and second set of switch elements and a controller circuit. The first set of switch elements comprises switch elements that are configured to couple terminals of capacitor elements to permit charge transfer between the capacitors. The second set of switch elements comprises switch elements that are configured to couple terminals of at least some of the capacitor elements to a first terminal, which is either a high voltage terminal or a low voltage terminal. The controller circuit is coupled to the switch elements and configured to cycle the switch elements through a sequence of states. Each state defines a corresponding configuration of the switch elements. At least three of the states define different configurations of the switch elements permitting charge transfer between a pair of elements. The pair of elements is either a pair of capacitors, or a capacitor and a terminal. The configured cycle of states provides a voltage conversion between the high voltage terminal and the low voltage terminal.

In some embodiments, there are terminals for coupling the switch elements to the capacitors.

Other embodiments include the capacitors themselves. In these embodiments, the capacitors, when coupled to the switch elements, define a charge pump circuit.

Some embodiments comprise an integrated circuit. In these embodiments, at least part of the charge pump circuit and at least part of the controller circuit are formed in a single integrated circuit.

Also among the embodiments are those that include a regulator circuit. In these embodiments, the regulator circuit is coupled to at least one of the high voltage terminal and the low voltage terminal of the charge pump circuit. In some of these embodiments, the regulator circuit is configured to provide a current load at the low voltage terminal of the charge pump circuit. In others, the regulator circuit is configured to operate as a current source at the low voltage terminal of the charge pump circuit. In yet others, the regulator circuit is configured to provide a current load at the high voltage terminal of the charge pump circuit, or to operate as a current source at the high voltage terminal of the charge pump circuit, or to cause a pulsed current to pass between the regulator circuit and the charge pump circuit. In the latter case, the charge pump operates in a pulse cycle having a first fraction, during which the pulsed current is a first constant current, and a second fraction, during which the pulsed current is greater in magnitude than the second constant current. In many cases, the second constant current is substantially zero or even equal to zero. Typically, the first constant current is substantially larger than the second constant current.

In some embodiments, a regulator circuit is configured to control an average current passing between the regulator circuit and the charge pump circuit.

In those embodiments that feature a regulator, a great many regulator types can be used. These include regulators that are switch-mode power converters, or buck converters, or even magnetic filters.

In some embodiments, the controller is configured to maintain each state for a corresponding duration of a fraction of a charge pump cycle time. The durations of these states are selected to maintain a balanced charging and discharging of each of the capacitors through the sequence of states of each cycle.

In other embodiments, the controller is configured to select durations of the states to reduce redistribution of charge among the capacitors upon state transitions.

When coupled to the terminals of the capacitor elements, the switch elements define any of a variety of charge pump circuits. Examples include a multi-phase charge pump, a single-phase charge pump, a multi-stage charge pump, and a cascade multiplier.

Also among the embodiments are those in which the controller is configured to receive sensor signals from at least one of the first and second sets of switch elements and to adaptively adjust cycling of the switch elements through the sequence of states based at least in part on the sensor signals.

In some embodiments, there are two regulator circuits. A regulator circuit is coupled to the high voltage terminal of the charge pump circuit. Meanwhile, a second regulator circuit is coupled to the low voltage terminal of the charge pump circuit. Either the first or second regulator can be a magnetic filter. Among these embodiments are those in which the controller is configured to receive sensor signals from at least one of the first and second sets of switch elements and to adaptively adjust cycling of the switch elements through the sequence of states based at least in part on the sensor signals.

In another aspect, the invention features a method for operating a charge pump in which switch elements from a first set of switch elements are configured to couple terminals of capacitor elements to permit charge transfer between the capacitors, and in which switch elements from a second set of switch elements are configured to couple terminals of capacitor elements to either a high voltage terminal or a low voltage terminal. Such a method includes causing a voltage conversion between the high voltage terminal and the low voltage terminal. Causing this voltage conversion includes cycling the switch elements through a sequence of states. Each state defines a corresponding configuration of the switch elements. At least three of the states define different configurations of the switch elements permitting charge transfer between a pair of elements. The pair of elements is either a pair of capacitors or a capacitor and a one of the terminals.

Some practices of the invention include maintaining an average current passing between a regulator circuit and the charge pump circuit. Others include regulating a current at the first terminal, thereby maintaining an average current passing between a regulator circuit and the charge pump circuit.

In other practices, cycling the switch elements through a sequence of states includes maintaining each state for a corresponding duration of a fraction of a charge pump cycle time. This can also include selecting the durations of the states are selected to maintain a balanced charging and discharging of each of the capacitors through the sequence of states of each cycle.

Some practices of the invention include controlling an average current between a regulator circuit and the charge pump circuit.

Other practices include coupling a regulator circuit to the first terminal. Among these are practices that include causing the regulator circuit to provide a current load at the low voltage terminal of the charge pump circuit, causing the regulator circuit to provide a current load at the high voltage terminal of the charge pump circuit, causing the regulator circuit to operate as a current source at the low voltage terminal of the charge pump circuit, causing the regulator circuit to operate as a current source at the high voltage terminal of the charge pump circuit, and causing a pulsed current to pass between a regulator circuit and the charge pump circuit.

Some practices include coupling the switch elements from the first and second sets of switch elements to the terminals of the capacitor elements. This can result in forming a multi-phase charge pump, a single-phase charge pump, a multi-stage charge pump, or a cascade multiplier.

Those practices that involve a regulator include selecting the type of regulator. This can include selecting the regulator to be a switch-mode power converter, selecting the regulator to be a buck converter, or selecting the regulator to be a magnetic filter.

Some practices also include receiving sensor signals from at least one of the first and second sets of switch elements and adaptively adjusting the cycling of the switch elements through the sequence of states based at least in part on the sensor signals.

Some practices involve the use of two regulators. These practices further include coupling a first regulator to the high voltage terminal and coupling a second regulator to the low voltage terminal. One of the regulators can be a magnetic filter while the other is a converter. Among these practices are those that also include controlling least one of the first and second sets of switch elements and adaptively adjusting the cycling of the switch elements through the sequence of states based at least in part on sensor signals received from at least one of said first and second sets of switch elements.

Other features and advantages of the invention are apparent from the following description, and from the claims.

DETAILED DESCRIPTION

Figure 1:
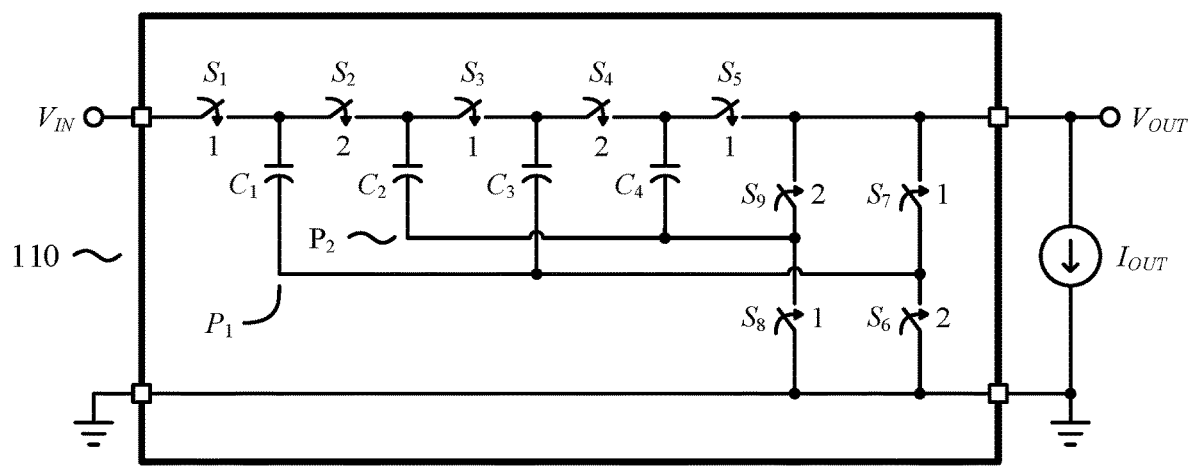
FIG. 1 is a schematic diagram of a single-phase 5:1 charge pump with a voltage source and a current load.

A first example charge pump 110 is shown in FIG. 1 to illustrate a source of charge imbalance in the operation of such a charge pump. The charge pump 110 is a cascade multiplier configured to nominally provide a 5:1 (i.e., M=5)

step-down in voltage such that an output voltage $V_{OUT}$ (volts) is one-fifth of an input voltage $V_{IN}$ (volts). Four capacitors (labeled $C_1$ to $C_4$) are used with switches (labeled $S_1$ to $S_9$) on both terminals of each capacitor to store a fraction of the input voltage $V_{IN}$ and transfer charge from one capacitor to the next. The capacitors closest to the $V_{IN}$ and $V_{OUT}$ terminals are labeled $C_1$ and $C_4$, respectively, and are referred to below as the "outer" capacitors, while the remaining capacitors labeled $C_2$ and $C_3$ are referred to below as the "inner" capacitors. As further notation, the voltage and charge on a capacitor $C_k$ are denoted $V_k$ and $Q_k$, respectively. Unless otherwise indicated, the capacitors are treated as ideally having identical capacitance C (Farads).

The charge pump 110 is operated by controlling a set of switches ($S_1$ through $S_9$) that cause charge to pass between the capacitors and between the terminals and the capacitors. The control of the switches of the charge pump 110 can be represented as a cycle through a series of states, where each state is associated with a particular configuration of the set of switches (i.e., a particular setting of open-circuit (non-conducting) and closed-circuit (conducting) configuration of each of the switches).

One mode of operation of the charge pump 110 shown in FIG. 1 uses a cycle of two states. In a first state, namely state 1, the switches labeled "1" (i.e., $S_1$, $S_3$, $S_5$, $S_7$, $S_8$) are closed and the switches labeled "2" (i.e., $S_2$, $S_4$, $S_6$, $S_9$) are open. In a second state, namely state 2, the switches labeled "1" are open and the switches labeled "2" are closed. These configurations of switches are shown in tabular form ("1" indicating the switch is closed and "0" indicating that the switch is open) as follows:

| State | Switch | | | | | | | | |
|---|---|---|---|---|---|---|---|---|---|
| | $S_1$ | $S_2$ | $S_3$ | $S_4$ | $S_5$ | $S_6$ | $S_7$ | $S_8$ | $S_9$ |
| State 1 | 1 | 0 | 1 | 0 | 1 | 0 | 1 | 1 | 0 |
| State 2 | 0 | 1 | 0 | 1 | 0 | 1 | 0 | 0 | 1 |

Note that in practice, additional states may be needed in which all or a sufficient set of switches are open such that charge is not passing to or from the capacitors without affecting the overall function of the charge pump 110. This occurs, for example, in a "break before make" approach to avoid the necessity of truly instantaneous switching. However, for the analysis of the ideal behavior below, such additional states are not generally considered because these additional states do not involve a transfer of charge and will not affect the outcome of the analysis.

A complete cycle of the charge pump 110 has a sequence of two states, state 1 followed by state 2. A first phase node $P_1$ couples with the negative terminal of the capacitors $C_1$, $C_3$, and a second phase node $P_2$ couples with the negative terminal of the capacitors $C_2$, $C_4$. The voltage at the first phase node $P_1$ alternates between ground and the output voltage $V_{OUT}$, and the voltage at the second phase node $P_2$ is out of phase with the first phase node $P_1$.

In steady-state operation, the capacitors $C_1$ to $C_4$ have nominal voltages across their terminals that are multiples of the nominal output voltage:

$$V_1^{(nom)} = 4 \cdot V_{OUT}^{(nom)} = (4/5) \cdot V_{IN}$$

$$V_2^{(nom)} = 3 \cdot V_{OUT}^{(nom)} = (3/5) \cdot V_{IN}$$

$$V_3^{(nom)} = 2 \cdot V_{OUT}^{(nom)} = (2/5) \cdot V_{IN}$$

$$V_4^{(nom)} = 1 \cdot V_{OUT}^{(nom)} = (1/5) \cdot V_{IN}$$

For example, when the input voltage $V_{IN}$ equal to 25.0 (volts), the nominal voltages across the capacitors $C_1$-$C_4$ are 20.0, 15.0, 10.0, and 5.0 (volts), respectively, and the nominal output voltage $V_{OUT}$ is 5.0 (volts). The actual voltages across the capacitors vary around these nominal values (i.e., the voltage exhibits "ripple") during a cycle of the successive states of operation of the charge pump 110, denoted as $$V_k = V_k^{(nom)} + v_k.$$

In this example, the output terminal of the charge pump 110 is treated as being coupled to a current load, with current $I_{OUT}$. In some examples, this current is assumed constant. More generally, as discussed further below, the current may be pulsed with a constant average $\bar{I}_{OUT} = D \cdot I_{OUT}^{(peak)}$, where D is the duty cycle (a fraction between zero and one) of the pulsed current load. This is a good representation of the behavior of a buck converter. In general, the current-load's switching frequency is an integer multiple of that charge pump's switching frequency. For example, it may be 2×, 3×, 10×, 100× the charge pump's switching frequency. In some examples, the current may be constant during a state, but have different values during each state. Furthermore, state transition instants are preferably chosen to occur during the zero-current part of the output current duty cycle, thereby reducing switching losses with non-ideal (e.g., transistor) switches. But for the sake of discussion of this first example, only the constant current case is considered.

Figure 2A:
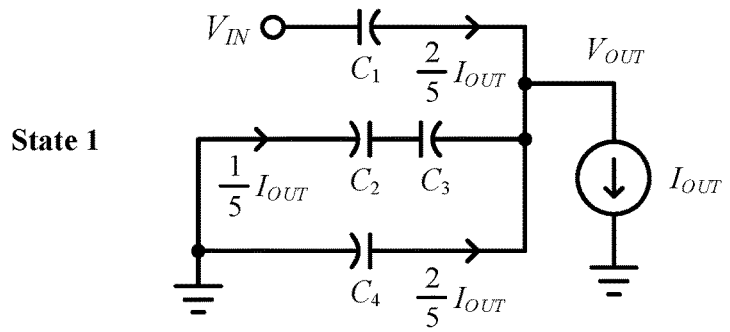
FIGS. 2A and 2B are schematic diagrams of the circuit of FIG. 1 in states 1 and 2, respectively, of the switch configuration.
Figure 2B:
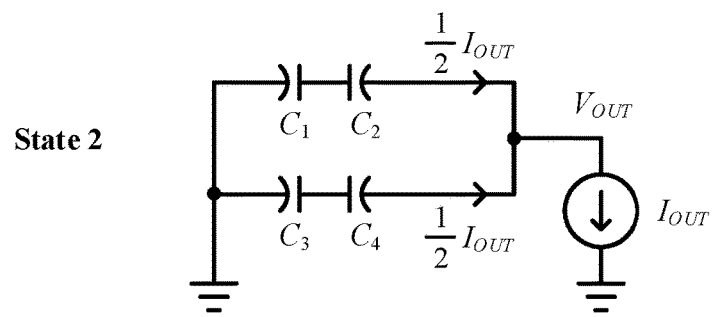

FIGS. 2A-2B show the equivalent circuits of the charge pump 110 in FIG. 1 for state 1 and state 2, respectively. In state 1, energy is transferred from the $V_{IN}$ terminal to the outer capacitor $C_1$, between the inner capacitors $C_2$, $C_3$, and from the outer capacitor $C_4$ to the $V_{OUT}$ terminal. In state 2, energy is transferred between the capacitors and to the load at the $V_{OUT}$ terminal.

During state 1, the outer capacitors $C_1$, $C_4$ carry a current of $0.4 \cdot I_{OUT}$ while the inner capacitors $C_2$, $C_3$ each carry a current of $0.2 \cdot I_{OUT}$. This is half the current through the outer capacitors $C_1$, $C_4$. Therefore, if state 1 has a state-duration time $t_1$, then the change in charge on the outer capacitors $C_1$, $C_4$, denoted $\Delta Q_{k,j}$ as the change in charge on capacitor $C_k$ during state j, satisfies $$+\Delta Q_{1,1} = -\Delta Q_{4,1} = t_1 \cdot 0.4 \cdot \bar{I}_{OUT}$$

while the change in charge on the inner capacitors $C_2$, $C_3$ during state 1 satisfies $$-\Delta Q_{2,1} = +\Delta Q_{3,1} = t_1 \cdot 0.2 \cdot \bar{I}_{OUT}.$$

Note that the inner capacitors $C_2$, $C_3$ are connected in series while the outer capacitors $C_1$, $C_4$ are the only elements in their respective paths, causing the current to divide accordingly by the number of series capacitors.

During state 2, every capacitor carries a current of $0.5 \cdot I_{OUT}$. The inner capacitors $C_2$, $C_3$ are always in a series connection with another capacitor in either state while the outer capacitors $C_1$, $C_4$ have a similar series connection only during state 2. The current flow polarity through each capacitor changes back and forth from one state to the next state as needed to charge and discharge the capacitor and maintain a constant average voltage across the capacitor.

If the charge pump 110 were controlled at a 50% duty cycle with $t_1 = t_2 = 0.5 \cdot T_{SW}$, where $T_{SW}$ is the total duration of the switching cycle, the net charge across each cycle of two states on each capacitor $C_k$, $\Delta Q_k = \Delta Q_{k,1} + \Delta Q_{k,2}$ would not be zero. A consequence of this would be that the net charge and average voltage on the capacitors may drift over successive cycles and/or may cause a sizeable redistribution of charge at each state transition. Neither of these would be desirable.

An alternative three-state control of the charge pump 110 shown in FIG. 1 uses first, second, and third states, which are labeled "1a", "1b", and "2". The configuration of the switches in these states is shown in tabular form as follows:

| | Switch | | | | | | | | |
|---|---|---|---|---|---|---|---|---|---|
| State | $S_1$ | $S_2$ | $S_3$ | $S_4$ | $S_5$ | $S_6$ | $S_7$ | $S_8$ | $S_9$ |
| State 1a | 1 | 0 | 0 | 0 | 1 | 0 | 1 | 1 | 0 |
| State 1b | 0 | 0 | 1 | 0 | 0 | 0 | 1 | 1 | 0 |
| State 2 | 0 | 1 | 0 | 1 | 0 | 1 | 0 | 0 | 1 |

Figure 3A:
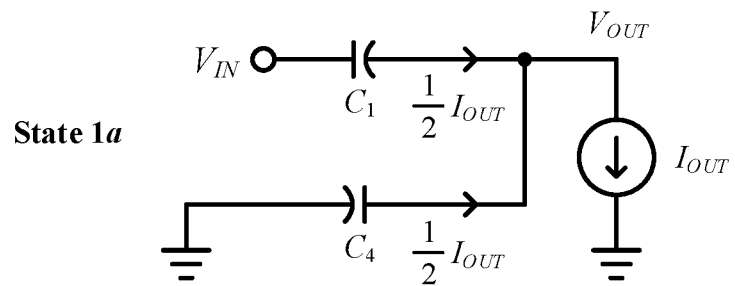
FIGS. 3A, 3B, and 3C are schematic diagrams of the circuit of FIG. 1 in states 1a, 1b, and 2, respectively.
Figure 3B:
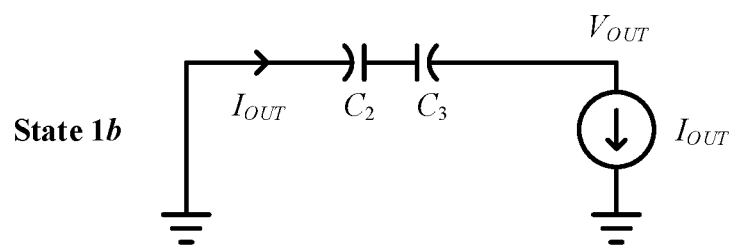
Figure 3C:
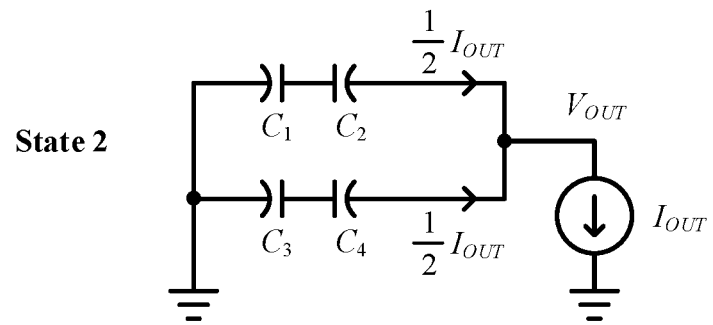

The equivalent circuits in each of these states are shown in FIGS. 3A-3C, respectively. Note that in state 1a, a current of $0.5 \cdot I_{OUT}$ passes through each of the capacitors $C_1$, $C_4$ (with opposite voltage polarities), in state 1b, a current of $1.0 \cdot I_{OUT}$ passes through the capacitors $C_2$, $C_3$, and in state 2, a current of $0.5 \cdot I_{OUT}$ passes through all four capacitors. A suitable selection of state-durations times $t_{1a}$, $t_{1b}$, $t_2$ to balance the total change in charge in each cycle must satisfy the set of equations:

$$\Delta Q_1 = 0 = +0.5 t_{1a} - 0.5 t_2$$

$$\Delta Q_2 = 0 = -1.0 t_{1b} + 0.5 t_2$$

$$\Delta Q_3 = 0 = +1.0 t_{1b} - 0.5 t_2$$

$$\Delta Q_4 = 0 = -0.5 t_{1a} + 0.5 t_2$$

$$T_{SW} = +1.0 t_{1a} + 1.0 t_{1b} + 1.0 t_2$$

where the set of equations are satisfied with $$t_{1a} = 0.4 \cdot T_{SW}$$

$$t_{1b} = 0.2 \cdot T_{SW}$$

$$t_2 = 0.4 \cdot T_{SW}$$

Figure 3D:
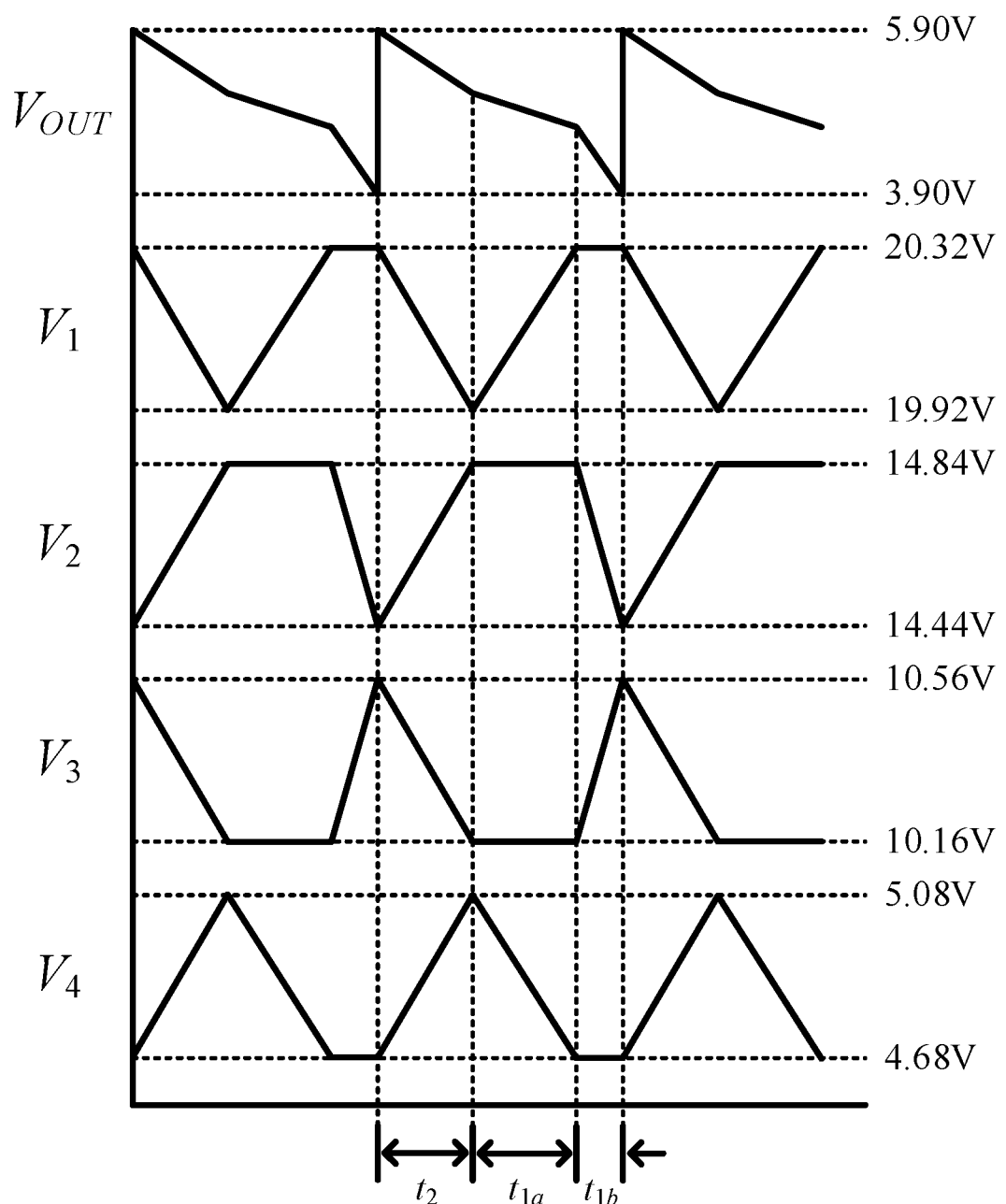
FIG. 3D is a set of waveforms showing the voltage across each capacitor in FIGS. 3A-3C during the operation of the charge pump.

Assuming the state-duration times above, FIG. 3D illustrates the voltages $V_1$-$V_4$ across the capacitors $C_1$-$C_4$ in FIGS. 3A-3C when the charge pump 110 has an input voltage $V_{IN}$ equal to 25.0 volts. This yields an output voltage $V_{OUT}$ with average voltage of approximately 5.0 volts as shown in the FIG. 3D.

Figure 4A:
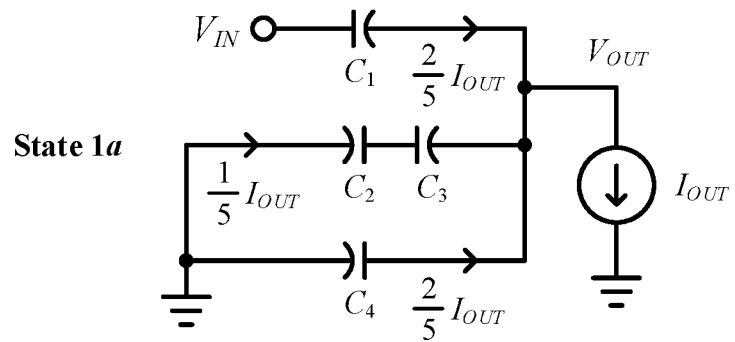
FIGS. 4A, 4B, and 4C are schematic diagrams of the circuit of FIG. 1 in alternative definitions of states 1a, 1b, and 2, respectively.
Figure 4B:
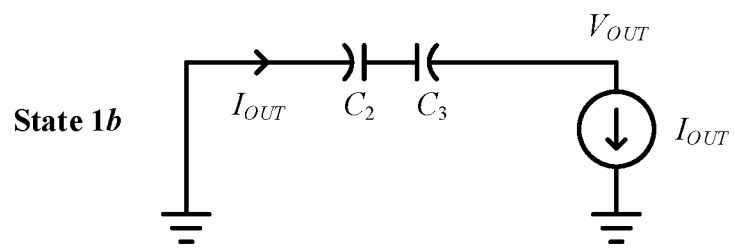
Figure 4C:
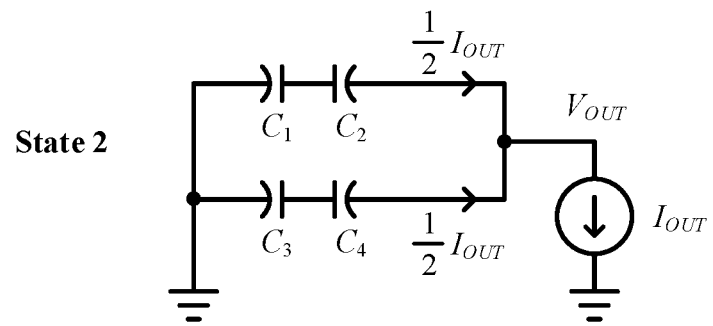

Another three-state approach to controlling the charge pump 110 of FIG. 1 uses a different sequence of states with switch configurations and corresponding equivalent circuits shown in FIGS. 4A-4C, respectively. The configuration of switches in the three states is shown in tabular form as:

| | Switch | | | | | | | | |
|---|---|---|---|---|---|---|---|---|---|
| State | $S_1$ | $S_2$ | $S_3$ | $S_4$ | $S_5$ | $S_6$ | $S_7$ | $S_8$ | $S_9$ |
| State 1a | 1 | 0 | 1 | 0 | 1 | 0 | 1 | 1 | 0 |
| State 1b | 0 | 0 | 1 | 0 | 0 | 0 | 1 | 1 | 0 |
| State 2 | 0 | 1 | 0 | 1 | 0 | 1 | 0 | 0 | 1 |

An analysis as presented above applied to this definition of the states yields state-duration times that satisfy the charge balance equations of $$t_{1a} = 0.5 \cdot T_{SW}$$

$$t_{1b} = 0.1 \cdot T_{SW}$$

$$t_2 = 0.4 \cdot T_{SW}$$

Figure 4D:
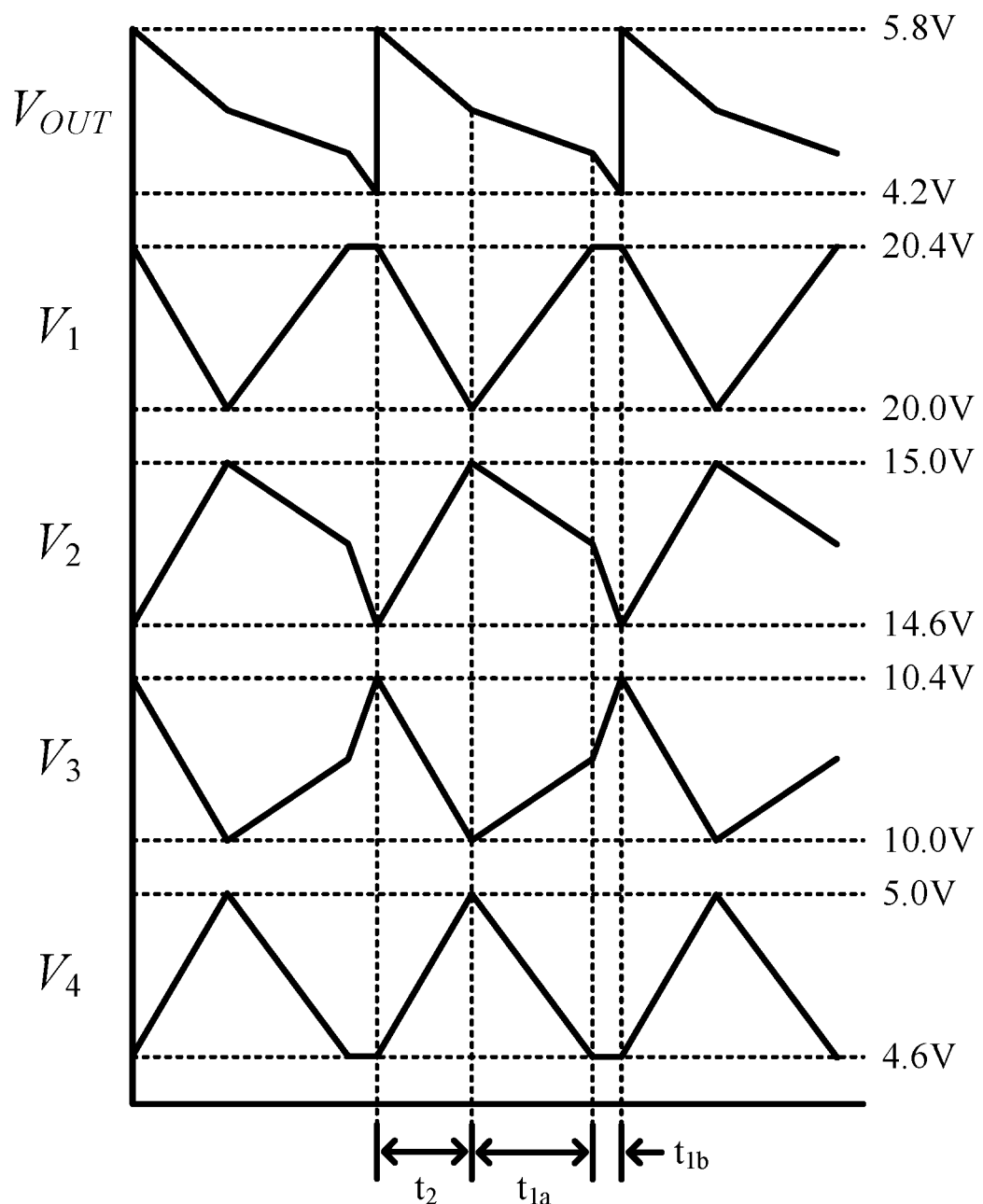
FIG. 4D is a set of waveforms showing the voltage across each capacitor in FIGS. 4A-4C during the operation of the charge pump.

Assuming the state-duration times above, FIG. 4D illustrates the voltages $V_1$-$V_4$ across the capacitors $C_1$-$C_4$ in FIGS. 4A-4C when the charge pump 110 has an input voltage $V_{IN}$ equal to 25.0 volts. This yields an output voltage $V_{OUT}$ with average voltage of approximately 5.0 volts as shown in FIG. 4D. Notice how the shape of the waveforms in FIG. 4D differ from those in FIG. 3D.

A consideration of the sum of the RMS (root mean squared) currents through the capacitors shows that these state definitions yield a lower value than that of the previously described three-state configuration (FIGS. 3A-3C). In a non-ideal implementation of the charge pump 110, in which resistances including resistances in series with the capacitors cause power loss, a lower RMS current is associated with smaller power loss. Therefore, these state configurations may be preferable.

Note that different sequences of states can still result in charge balance over the repeating cycle. For example, the state sequence 1a-1b-2-1a-1b-2 . . . can be replaced with the sequence 1b-1a-2-1b-1a-2 . . . using the same state-duration times as determined above.

Other state definitions and timing also follow the approach outlined above. For instance, two additional approaches for the M=5 case are shown below in tabular form:

| | Switch | | | | | | | | | |
|---|---|---|---|---|---|---|---|---|---|---|
| State | $S_1$ | $S_2$ | $S_3$ | $S_4$ | $S_5$ | $S_6$ | $S_7$ | $S_8$ | $S_9$ | Duration |
| State 1a | 0 | 0 | 1 | 0 | 1 | 0 | 1 | 1 | 0 | $0.3 \cdot T_{SW}$ |
| State 1b | 1 | 0 | 1 | 0 | 0 | 0 | 1 | 1 | 0 | $0.3 \cdot T_{SW}$ |
| State 2 | 0 | 1 | 0 | 1 | 0 | 1 | 0 | 0 | 1 | $0.4 \cdot T_{SW}$ | and

| | Switch | | | | | | | | | |
|---|---|---|---|---|---|---|---|---|---|---|
| State | $S_1$ | $S_2$ | $S_3$ | $S_4$ | $S_5$ | $S_6$ | $S_7$ | $S_8$ | $S_9$ | Duration |
| State 1a | 1 | 0 | 0 | 0 | 0 | 0 | 1 | X | 0 | $0.2 \cdot T_{SW}$ |
| State 1b | 0 | 0 | 0 | 0 | 1 | 0 | X | 1 | 0 | $0.2 \cdot T_{SW}$ |
| State 1c | 0 | 0 | 1 | 0 | 0 | 0 | 1 | 1 | 0 | $0.2 \cdot T_{SW}$ |
| State 2 | 0 | 1 | 0 | 1 | 0 | 1 | 0 | 0 | 1 | $0.4 \cdot T_{SW}$ | where X indicates that the switch can either be open or closed.

The multi-state approach presented above for the M=5 circuit of FIG. 1 may be extended directly to other odd values of M. Generally, in state 1a, capacitor $C_1$ is in parallel with capacitor $C_{M-1}$, and when M≥5 in parallel with series connections of $C_2$ and $C_3$, through $C_{M-3}$ and $C_{M-2}$. State 1b has the parallel connection of the series of $C_2$ and $C_3$, through $C_{M-3}$ and $C_{M-2}$, and state 2 has the parallel connection of the series $C_1$ and $C_2$ through $C_{M-2}$ and $C_{M-1}$. A closed form of the state-duration times for general odd M can then be expressed as $$t_{1a} = (M+5)/(4M) \cdot T_{SW}$$

$$t_{1b} = (M-3)/(4M) \cdot T_{SW}$$

$$t_2 = (M-1)/(2M) \cdot T_{SW}$$

Figure 5:
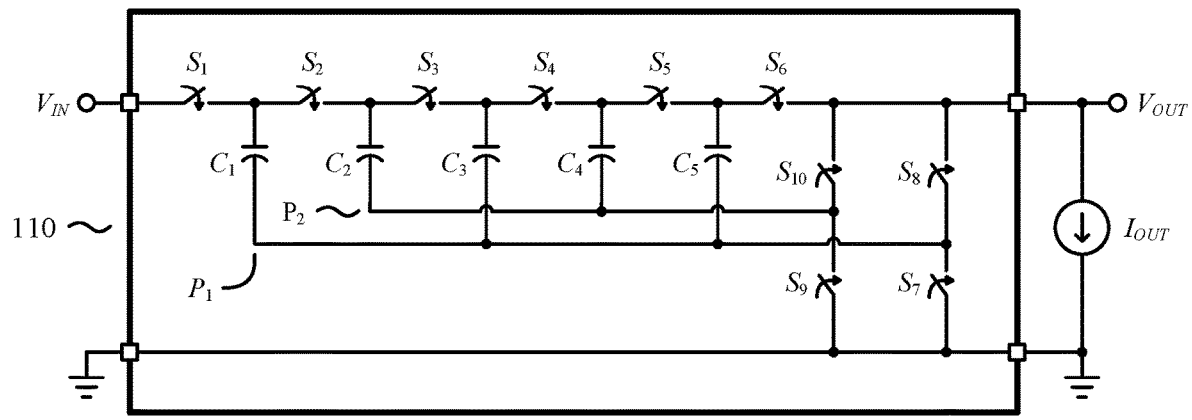
FIG. 5 is a schematic diagram of a single-phase 6:1 charge pump with a voltage source and a current load.
Figure 6A:
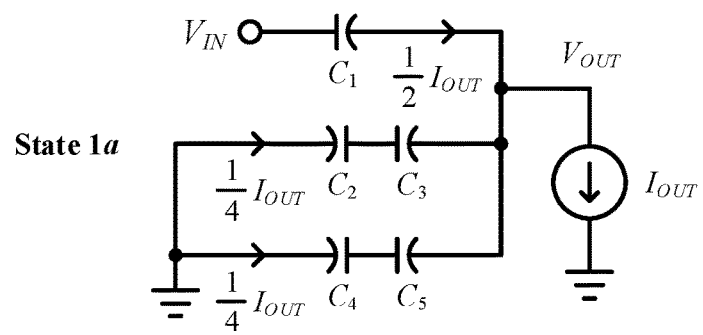
FIGS. 6A, 6B, 6C, and 6D are schematic diagrams of the circuit of FIG. 5 in states 1a, 1b, 2a, and 2b, respectively.
Figure 6B:
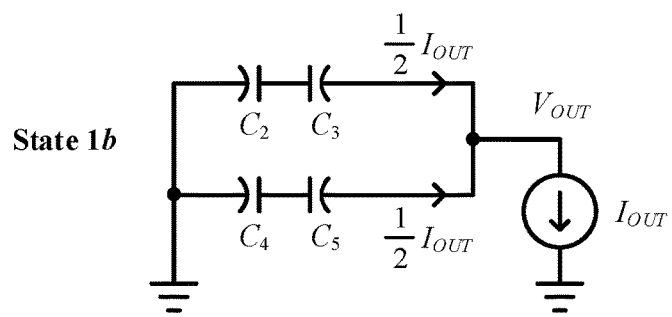
Figure 6C:
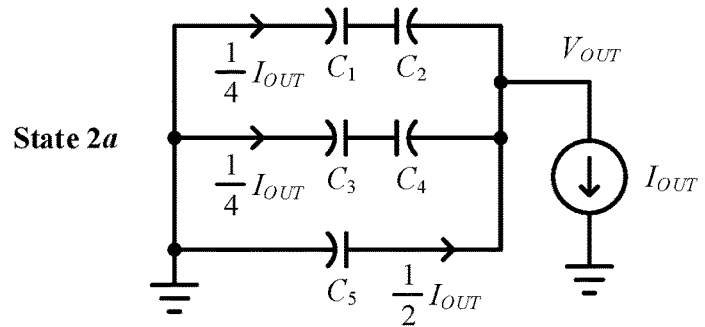
Figure 6D:
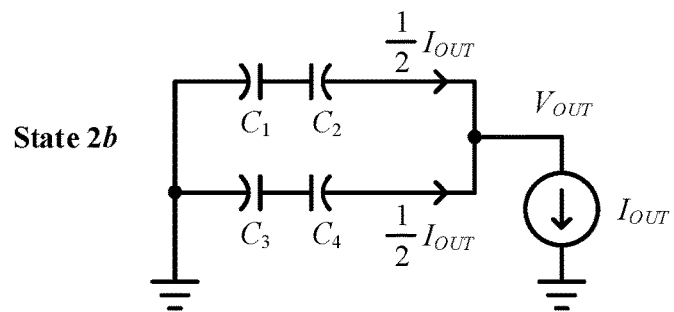

A similar approach can be applied to situations where M is even. Referring to FIG. 5, a 6:1 (M=6) cascade multiplier type charge pump 110 is shown that includes ten switches labeled $S_1$ to $S_{10}$ and five capacitors labeled $C_1$ to $C_5$. The configurations for the switches in each of four states: 1a, 1b, 2a, and 2b, are shown in the table below. The equivalent circuits in each of these states are shown in FIGS. 6A-6D, respectively.

|  | Switch | | | | | | | | | |
|---|---|---|---|---|---|---|---|---|---|---|
| State | $S_1$ | $S_2$ | $S_3$ | $S_4$ | $S_5$ | $S_6$ | $S_7$ | $S_8$ | $S_9$ | $S_{10}$ |
| State 1a | 1 | 0 | 1 | 0 | 1 | 0 | 0 | 1 | 1 | 0 |
| State 1b | 0 | 0 | 1 | 0 | 1 | 0 | 0 | 1 | 1 | 0 |
| State 2a | 0 | 1 | 0 | 1 | 0 | 1 | 1 | 0 | 0 | 1 |
| State 2b | 0 | 1 | 0 | 1 | 0 | 0 | 1 | 0 | 0 | 1 |

Figure 7:
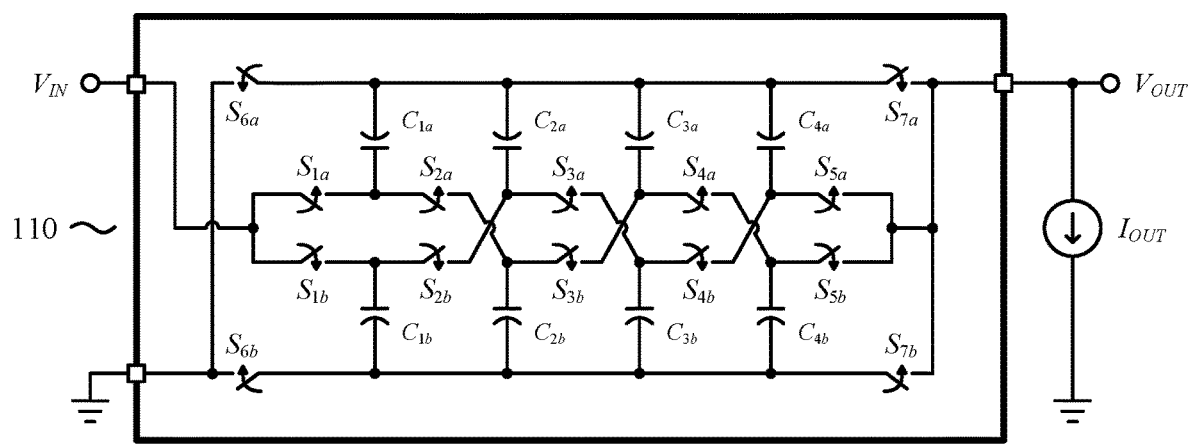
FIG. 7 is a schematic diagram of a two-phase 5:1 charge pump with a voltage source and a current load.

Applying the type of analysis described above, the state-duration times to achieve a balancing of charge transfer through the cycle of states yields:

$t_{1a} = 1/3 \cdot T_{SW}$ $t_{1b} = 1/6 \cdot T_{SW}$ $t_{2a} = 1/3 \cdot T_{SW}$ $t_{2b} = 1/6 \cdot T_{SW}$ As with M being an odd case, a general solution for arbitrary M being even yields the solution:

$t_{1a} = (M-2)/(2M) \cdot T_{SW}$ $t_{1b} = 1/M \cdot T_{SW}$ $t_{2a} = (M-2)/(2M) \cdot T_{SW}$ $t_{2b} = 1/M \cdot T_{SW}$ The approach described above is applicable to multi-phase charge pumps as well. For example, FIG. 7 shows a two-phase M=5 cascade multiplier type charge pump 110 that includes fourteen switches labeled $S_{1a}$ to $S_{7b}$ and eight capacitors labeled $C_{1a}$ to $C_{4b}$.

The configurations for the switches in one possible four-state approach (with states labeled 1a, 1b, 2a, 2b) are shown in the table below:

|  | Switch | | | | | | | | | | | | | |
|---|---|---|---|---|---|---|---|---|---|---|---|---|---|---|
| State | $S_{1a}$ | $S_{1b}$ | $S_{2a}$ | $S_{2b}$ | $S_{3a}$ | $S_{3b}$ | $S_{4a}$ | $S_{4b}$ | $S_{5a}$ | $S_{5b}$ | $S_{6a}$ | $S_{6b}$ | $S_{7a}$ | $S_{7b}$ |
| State 1a | 1 | 0 | 0 | 1 | 0 | 1 | 0 | 1 | 0 | 0 | 0 | 1 | 1 | 0 |
| State 1b | 0 | 0 | 0 | 1 | 0 | 1 | 0 | 1 | 0 | 1 | 0 | 1 | 1 | 0 |
| State 2a | 0 | 1 | 1 | 0 | 1 | 0 | 1 | 0 | 0 | 0 | 1 | 0 | 0 | 1 |
| State 2b | 0 | 0 | 1 | 0 | 1 | 0 | 1 | 0 | 1 | 0 | 1 | 0 | 0 | 1 |

Figure 8A:
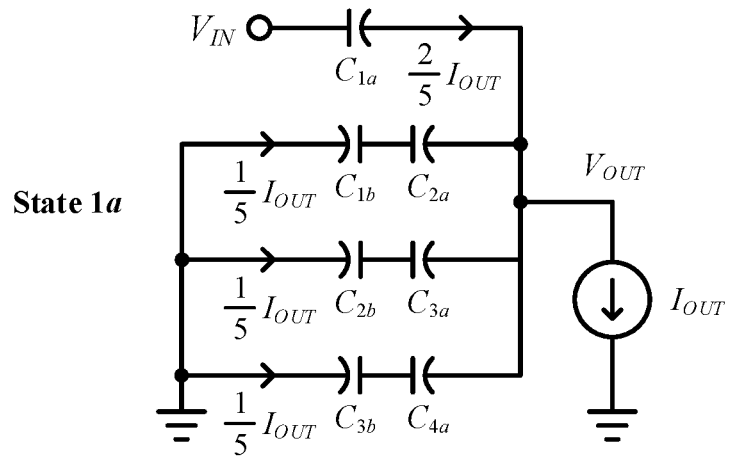
FIGS. 8A and 8B are schematic diagrams of the circuit of FIG. 7 in states 1a and 1b, respectively.
Figure 8B:
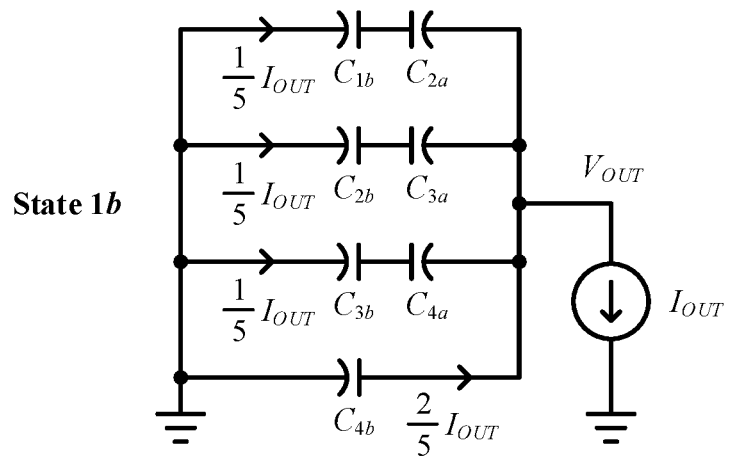

FIGS. 8A-8B show the equivalent circuits for states 1a and 1b, respectively. The circuits for states 2a and 2b are equivalent (i.e., interchanging the "a" and "b" elements of the circuit). Applying the charge balance constraints for this circuit yields the state-duration times of $0.25 \cdot T_{SW}$ for each of the four states as shown below:

$t_{1a} = t_{2a} = 0.25 \cdot T_{SW}$ $t_{1b} = t_{2b} = 0.25 \cdot T_{SW}$

Note that in this example, the input current from the $V_{IN}$ terminal is zero during states 1b and 2b while non-zero during states 1a and 2a at a current of $0.4 \cdot I_{OUT}$, yielding an average input current of $0.2 \cdot I_{OUT} = I_{OUT}/M$ as expected.

Referring to FIG. 7, a parallel arrangement of two sections as shown in FIG. 1; the timing of each section is 90° out of phase, such that one section has the switch configuration of state 1a while the other section has the switch configuration of state 1b, and so forth. Note that in this parallel arrangement, the average input current is $0.2 \cdot I_{OUT} = I_{OUT}/M$ in each cycle of operation.

Figure 9:
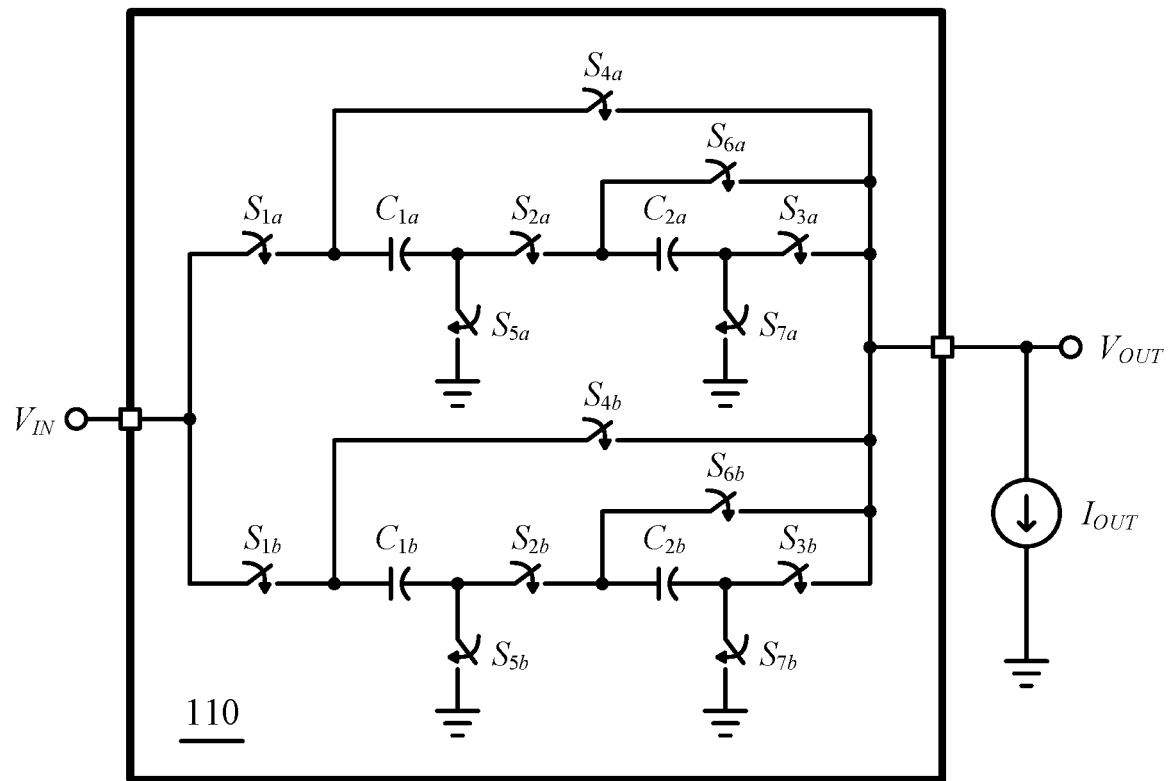
FIG. 9 is a schematic of a two-phase 3:1 series-parallel charge pump with a voltage source and a current load.
Figure 10A:
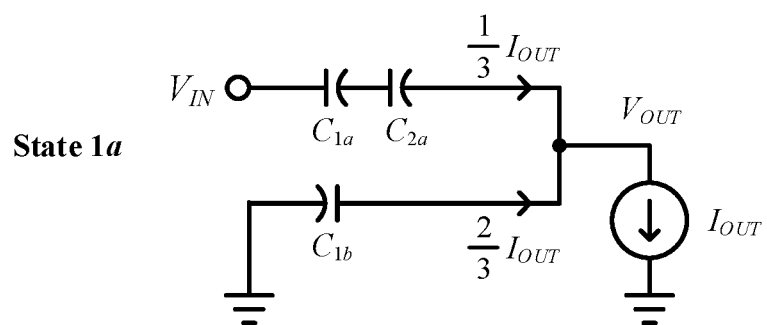
FIGS. 10A, 10B, 10C, and 10D are schematic diagrams of the circuit of FIG. 9 in states 1a, 1b, 2a, and 2b, respectively.
Figure 10B:
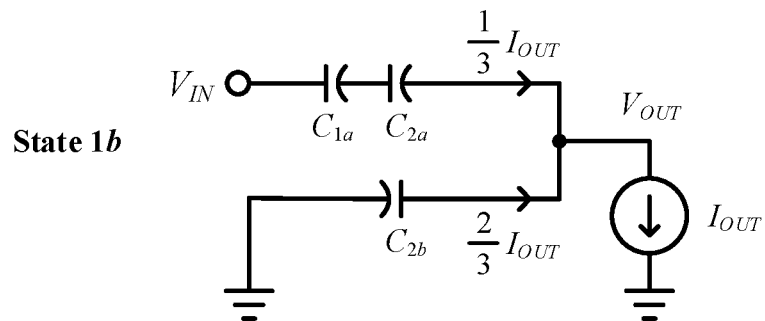
Figure 10C:
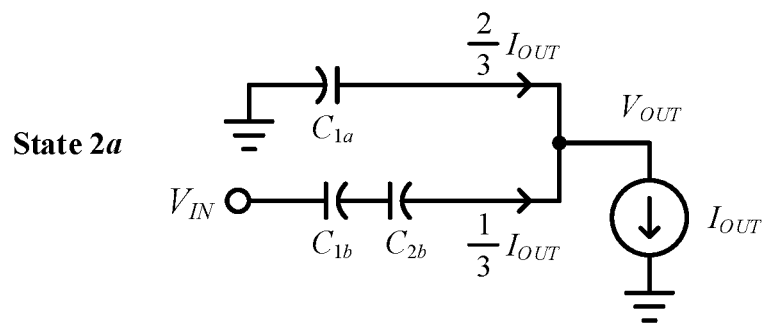
Figure 10D:
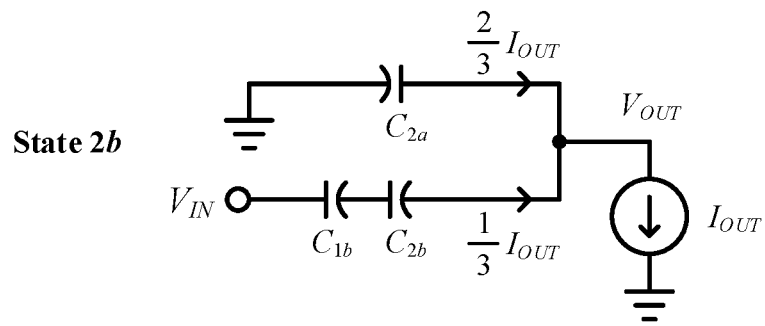

The approaches described above are applicable to a wide range of charge pump topologies. As a further example, an FIG. 9 shows a M=3 two-phase series-parallel charge pump 110 that includes fourteen switches labeled $S_{1a}$ to $S_{7b}$ and four capacitors labeled $C_{1a}$ to $C_{2b}$. The configuration of switches in the four states is shown in tabular form as:

|  | Switch | | | | | | | | | | | | | |
|---|---|---|---|---|---|---|---|---|---|---|---|---|---|---|
| State | $S_{1a}$ | $S_{1b}$ | $S_{2a}$ | $S_{2b}$ | $S_{3a}$ | $S_{3b}$ | $S_{4a}$ | $S_{4b}$ | $S_{5a}$ | $S_{5b}$ | $S_{6a}$ | $S_{6b}$ | $S_{7a}$ | $S_{7b}$ |
| State 1a | 1 | 0 | 1 | 0 | 1 | 0 | 0 | 1 | 0 | 1 | 0 | 0 | 0 | 0 |
| State 1b | 1 | 0 | 1 | 0 | 1 | 0 | 0 | 0 | 0 | 0 | 0 | 1 | 0 | 1 |
| State 2a | 0 | 1 | 0 | 1 | 0 | 1 | 1 | 0 | 1 | 0 | 0 | 0 | 0 | 0 |
| State 2b | 0 | 1 | 0 | 1 | 0 | 1 | 0 | 0 | 0 | 0 | 1 | 0 | 1 | 0 |

Equivalent circuits for the four states are shown in FIGS. 10A-10D. Charge balance is achieved with a state-duration time of $0.25 \cdot T_{SW}$ for each state, yielding an average input current from $V_{IN}$ in each state and cycle of $(1/3) \cdot I_{OUT}$.

In the analysis above, the average current $I_{OUT}$ is assumed to be the same during all state-duration times, therefore, the charge transfers are proportional to $t_j \cdot I_{OUT}$. In an alternative approach, the average output current may be controlled to be different for different states so that the charge transfers in state $j$ are proportional to $t_j \cdot I_{OUT,j}$ where both the state-duration time $t_j$ and the average current $I_{OUT,j}$ are determined according to the constraint equations. In some examples, the state-duration times may be further (fully or partially) constrained for other considerations, for example, to avoid short state-duration times which might cause EMI (electromagnetic interference). An example, where such variable and periodic control of output current may be effective is when driving one or more LEDs (light emitting diode) in series or in parallel, where the variation in current does not appreciably cause perceptible variation in light output.

Figure 11A:
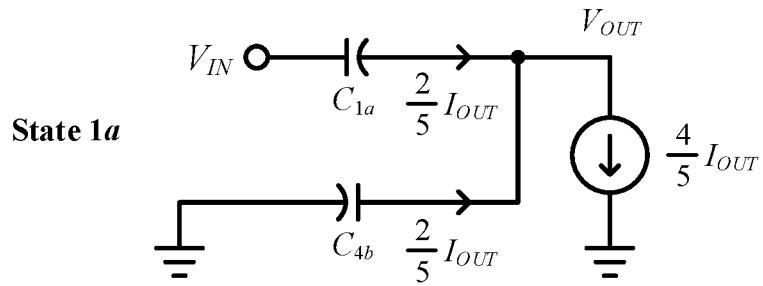
FIGS. 11A and 11B are schematic diagrams of the circuit of FIG. 7 in states 1a and 1b, respectively with current skew.
Figure 11B:
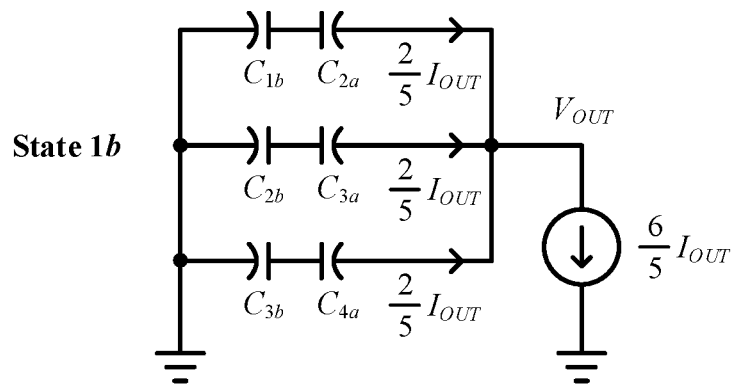

The approach described above can be applied to the two-phase M=5 cascade multiplier type charge pump 110 of FIG. 7. One possible four-state approach (with states labeled 1a, 1b, 2a, 2b) has equivalent circuits as shown in FIGS. 11A-11B for states 1a and 1b, respectively. The circuits for states 2a and 2b are equivalent (i.e. interchanging the "a" and "b" elements of the circuit). The configuration of switches in the four states is shown in tabular form as:

|  | Switch | | | | | | | | | | | | | |
|---|---|---|---|---|---|---|---|---|---|---|---|---|---|---|
| State | $S_{1a}$ | $S_{1b}$ | $S_{2a}$ | $S_{2b}$ | $S_{3a}$ | $S_{3b}$ | $S_{4a}$ | $S_{4b}$ | $S_{5a}$ | $S_{5b}$ | $S_{6a}$ | $S_{6b}$ | $S_{7a}$ | $S_{7b}$ |
| State 1a | 1 | 0 | 0 | 0 | 0 | 0 | 0 | 0 | 1 | 0 | 1 | 1 | 0 |  |
| State 1b | 0 | 0 | 0 | 1 | 0 | 1 | 0 | 1 | 0 | 0 | 0 | 1 | 1 | 0 |

-continued

| State | \multicolumn{14}{c}{Switch} |
|---|---|---|---|---|---|---|---|---|---|---|---|---|---|---|
| | $S_{1a}$ | $S_{1b}$ | $S_{2a}$ | $S_{2b}$ | $S_{3a}$ | $S_{3b}$ | $S_{4a}$ | $S_{4b}$ | $S_{5a}$ | $S_{5b}$ | $S_{6a}$ | $S_{6b}$ | $S_{7a}$ | $S_{7b}$ |
| State 2a | 0 | 1 | 0 | 0 | 0 | 0 | 0 | 0 | 1 | 0 | 1 | 0 | 0 | 1 |
| State 2b | 0 | 0 | 1 | 0 | 1 | 0 | 1 | 0 | 0 | 0 | 1 | 0 | 0 | 1 |

With state-duration times of $0.25 \cdot T_{SW}$ for each of the four states, it becomes necessary to apply a current skew, $I_{SKEW}$, to the output load in each state to achieve charge balance over a cycle of the four states. In this example, a negative current skew of $0.2 \cdot I_{OUT}$ during states 1a and 2a, and a positive current skew of $0.2 \cdot I_{OUT}$ during states 1b and 2b will achieve charge balance in all capacitors over a cycle, where the average output current across each cycle of four states is $I_{OUT}$. In other words, the output load current during states 1a and 2a is $0.8 \cdot I_{OUT}$ and the output load current during states 1b and 2b is $1.2 \cdot I_{OUT}$. The magnitude of the applied current skew is the same in all four states, but the polarity of the current skew changes back and forth between positive and negative from one state to the next. For a two-phase charge pump with this four-state approach and $0.25 \cdot T_{SW}$ state-duration times, a general solution for arbitrary M yields the following solution for the magnitude of the applied current skew, $I_{SKEW}$:

$$I_{SKEW} = \left|\frac{4-M}{M}\right| I_{OUT}$$

It should be understood that the description above focuses on analysis of idealized circuits with ideal switches, ideal current, voltage sources, and resistance-free circuit paths. In practice, switches are implemented, for instance, with transistors, which generally exhibit internal resistance and capacitive characteristics. The output current load may be implemented using an inductor such that during the part of the duty cycle modeled as a constant current, the current in fact fluctuates as energy is transferred from the charge pump to the inductor. Physical capacitors may have slightly different capacitances, and therefore the ideal analysis for charge balancing may not be exactly correct. Nevertheless, the approach presented above is applicable to non-ideal implementations of the approach, either exactly, or accounting for the non-ideal nature of the circuit for example, determining the state durations to achieve charge balance in a real rather than an ideal circuit, for example, using numerical circuit simulation techniques.

Figure 12:
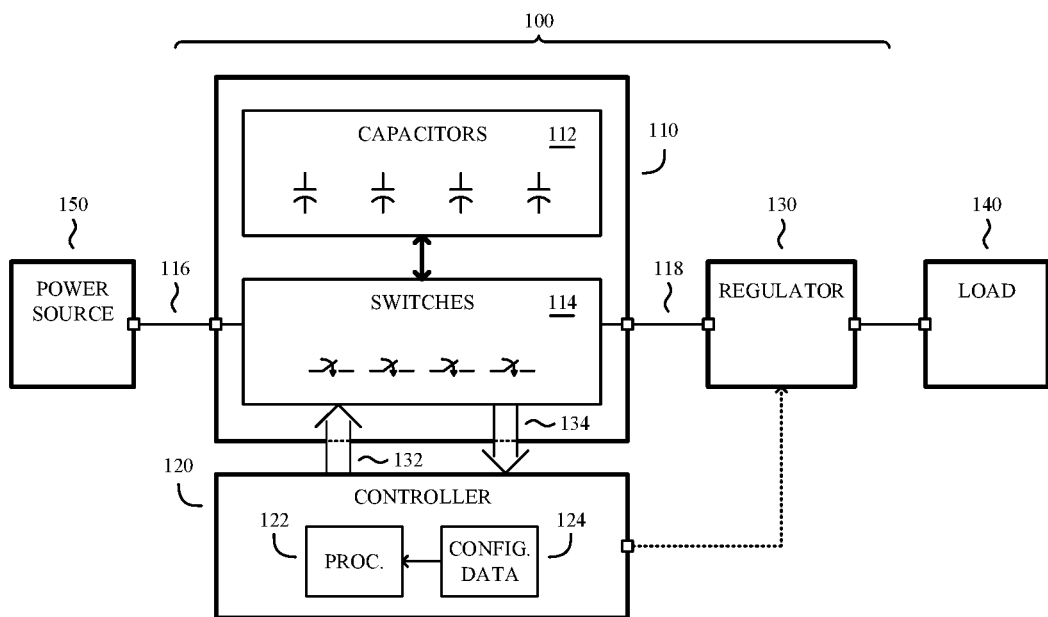
FIGS. 12, 13, and 14 are block diagrams of power converters.

Implementations of a charge pump controlled according to one or more of the approaches described above may use a controller that is configured to follow a state sequence as described and to set the switches accordingly. Referring to FIG. 12, an example of a power converter 100 includes a charge pump 110 coupled to a controller 120 providing control signals on path 132 and receiving sensor signals on path 134. The charge pump 110 includes capacitors 112 and switches 114. A terminal 116 (e.g., a high voltage terminal) couples the charge pump 110 to a power source 150, for example, to a voltage source (e.g., at twenty-five volts). Another terminal 118 couples the charge pump 110 to a first regulator circuit 130, which is coupled to a load 140. A controller 120 includes a programmable processor 122 configured with configuration data 124 (and/or processor instructions), which impart functionality on the controller 120.

In some examples, the controller 120 also controls the first regulator circuit 130, for example, to maintain a common underlying clocking rate for both the charge pump 110 and the first regulator circuit 130 (e.g., switching the first regulator circuit 130 at a multiple 2×, 4×, 10×, 100×, etc. of the cycle frequency of the charge pump 110). In some implementations, the controller 120 is integrated in whole or in part in an integrated device that includes at least some of the switches 114 (e.g., transistors).

Figure 13:
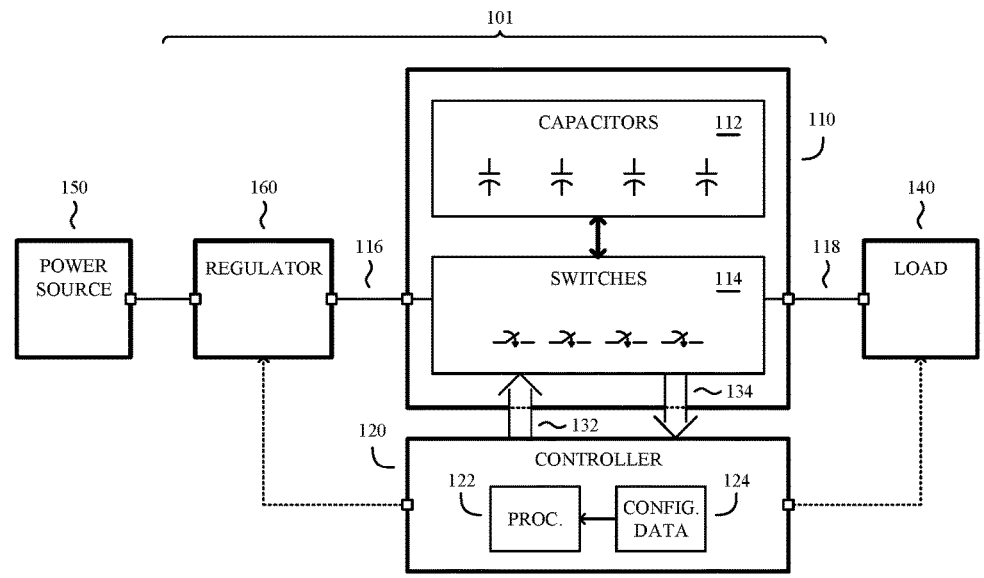

An alternative power converter 101 is illustrated in FIG. 13, where a second regulator circuit 160 is coupled between the power source 150 and the charge pump 110 instead of between the load 140 and the charge pump 110 as in FIG. 12. In some examples, the controller 120 controls the load 140 to facilitate charge balancing of the capacitors 112 within the charge pump 110. In other examples, the controller 120 controls the second regulator circuit 160 and in even other examples, the controller 120 controls both the load 140 and the second regulator circuit 160.

Figure 14:
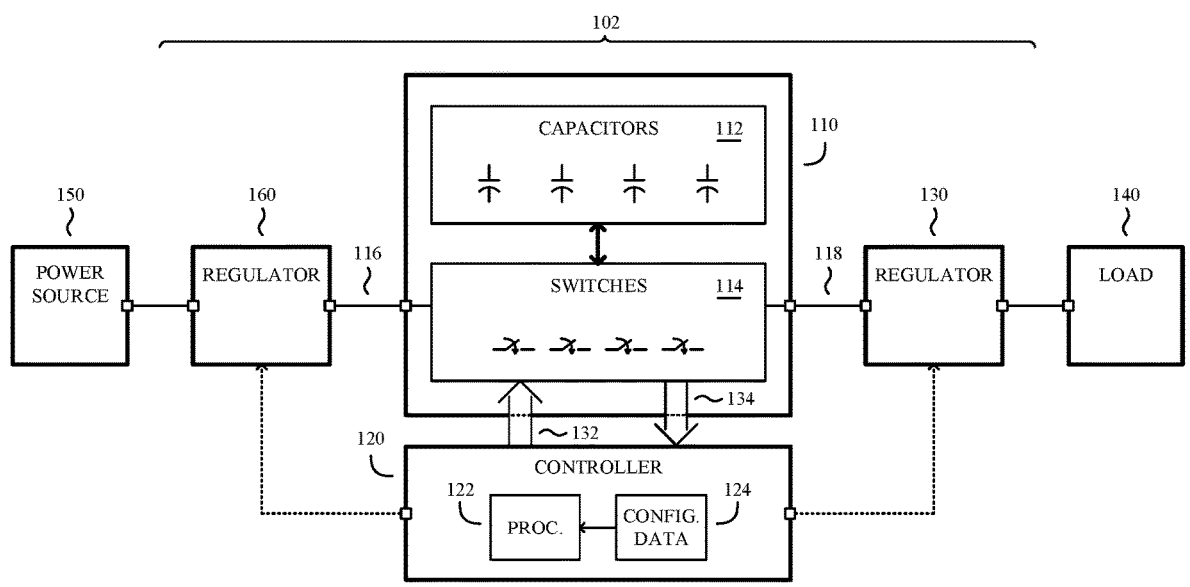

One more alternative power converter 102 is illustrated in FIG. 14. This example is a combination of the power converters 100, 101. In this implementation, there is a first regulator circuit 130 coupled between the load 140 and the charge pump 110; and a second regulator circuit 160 coupled between the power source 150 and the charge pump 110. In some examples the controller 120 controls at least the first regulator circuit 130 or the second regulator circuit 160, to maintain a common underlying clocking.

In other examples, either the first regulator circuit 130 or the second regulator circuit 160 is a magnetic filter, such as an LC filter, instead of a converter. If the first regulator circuit 130 is a magnetic filter, then the regulation capability of the power converter 102 is only accomplished by the second regulator circuit 160 and adiabatic operation is in part possible due to the first regulator circuit 130 acting as a current load. Similarly, if the second regulator circuit 160 is a magnetic filter, then the regulation capability of the power converter 102 is only accomplished by the first regulator circuit 130 and adiabatic operation is in part possible due to the second regulator circuit 160 acting as a current source.

It should be understood that in practice, the devices are not ideal, for example, with the capacitors 112 not necessarily having identical capacitances, and with non-zero resistances in circuit paths and through the switches 114 in the charge pump 110. In some examples, the controller 120 controls the switches 114 according to the idealized analysis. In other examples, the effect of non-idealized characteristics are taken into account in determining the state durations, for example, by explicit circuit analysis (e.g., simulation) or adaptively by adjusting the relative state durations to achieve charge balance during state cycles based upon sensor signals on path 134. In some examples, the controller 120 is software configurable, for example, allowing specific state timing to be configured after the device is fabricated. In some examples, the controller 120 is fully or at least partially implemented in application-specific logic that is specified with the other circuit components of the device.

The charge pump 110 can be implemented using many different charge pump topologies such as Ladder, Dickson, Series-Parallel, Fibonacci, and Doubler. Similarly, suitable converters for the regulator circuits 130, 160 include Buck converters, Boost converters, Buck-Boost converters, non-inverting Buck-Boost converters, Cuk converters, SEPIC converters, resonant converters, multi-level converters, Flyback converters, Forward converters, and Full Bridge converters.

It is to be understood that the foregoing description is intended to illustrate and not to limit the scope of the invention, which is defined by the scope of the appended claims. Other embodiments are within the scope of the following claims.

The invention claimed is:

1. An apparatus comprising:
a clock to generate one or more timing signals;
a charge pump coupled to at least one inductor, the charge pump having an input port and an output port and comprising a plurality of capacitors interconnected via one or more sets of switches controllable to switch between a plurality of switch configurations, a particular switch configuration of the plurality of switch configurations to correspond to a particular state of a plurality of states of the charge pump; and
a controller to generate one or more control signals based, at least in part, on the one or more timing signals, the one or more control signals to control at least a duty cycle of the particular switch configuration of the plurality of switch configurations to reduce redistribution of charge between two or more capacitors of the plurality of capacitors such that there is substantially no total change in charge on at least one of the two or more capacitors.

2. The apparatus of claim 1, wherein the redistribution of charge to at least partially result from a charge imbalance within the charge pump to occur due, at least in part, to the at least one inductor being coupled to the charge pump.

3. The apparatus of claim 2, wherein the charge imbalance within the charge pump to comprise an imbalance with respect to a total change in charge on the plurality of capacitors over a full operating cycle of the charge pump.

4. The apparatus of claim 3, wherein the plurality of states to comprise the full operating cycle of the charge pump.

5. The apparatus of claim 1, wherein the plurality of states to include at least a first, a second, and a third state having corresponding state duration times.

6. The apparatus of claim 5, wherein the corresponding state duration times to be controlled by the controller to reduce the redistribution of charge between the two or more capacitors of the plurality of capacitors at the particular state of the charge pump.

7. The apparatus of claim 1, wherein the at least one inductor to be coupled to at least one of the following ports of the charge pump: the input port; the output port; or any combination thereof.

8. The apparatus of claim 1, wherein the at least one inductor comprises at least one of the following: a regulator; a load; or any combination thereof.

9. The apparatus of claim 8, wherein the regulator comprises at least one of the following: a converter; a magnetic filter; or any combination thereof.

10. The apparatus of claim 9, wherein the converter comprises a buck converter; a boost converter; a buck-boost converter; a non-inverting buck-boost converter; a Cuk converter; a SEPIC converter; a resonant converter; a multi-level converter; a flyback converter; a forward converter; or a full bridge converter.

11. The apparatus of claim 8, wherein the regulator to control an average current between the regulator and the charge pump.

12. The apparatus of claim 1, wherein the charge pump comprises a multi-phase charge pump; a single-phase charge pump; a multi-stage charge pump; or a cascade multiplier.

13. The apparatus of claim 1, wherein the one or more control signals to adaptively adjust the duty cycle of the particular switch configuration of the plurality of switch configurations based, at least in part, on one or more sensor signals to be received from the one or more sets of switches.

14. An apparatus comprising:
an integrated circuit (IC);
the IC comprising a controller to implement at least a three-state control of a charge pump including two or more capacitors coupled to a plurality of switches along a charge transfer path between an input port and an output port of the charge pump,
the controller, during a plurality of successive operating cycles of the charge pump, to control operation of the plurality of switches so that the charge pump is able to transition from a first state to a second state and to at least a third state, the first, the second, or the third states to have corresponding duty cycles,
wherein the controller, during at least one operating cycle of the plurality of successive operating cycles of the charge pump, to facilitate a total change in charge on the two or more capacitors based, at least in part, on the corresponding duty cycles of the first, the second, or the third states such that the total change in charge on at least one of the two or more capacitors is balanced, and
wherein a net charge on the at least one of the two or more capacitors does not substantially change.

15. The apparatus of claim 14, wherein the charge pump circuit comprises a multi-phase charge pump.

16. The apparatus of claim 15, wherein the multi-phase charge pump to transition from a first phase to a second phase and to subsequently transition from the second phase to the first phase.

17. The apparatus of claim 16, wherein the first, the second, and the third states to be implemented for the first phase and/or for the second phase of the multi-phase charge pump.

18. The apparatus of claim 14, wherein the at least one of the two or more capacitors to hold a constant amount of charge during at least one of the first, the second, and the third states.

19. The apparatus of claim 14, wherein the controller to adaptively adjust the corresponding duty cycles of the first, the second, and the third states based, at least in part, on one or more sensor signals to be received from one or more switches of the plurality of switches.

20. The apparatus of claim 14, wherein the controller, during the at least one operating cycle of the plurality of successive operating cycles of the charge pump, to facilitate a voltage conversion between the input port and the output port of the charge pump.

21. The apparatus of claim 14, wherein the charge pump to output an average output current, the average output current to be maintained, at least in part, by the controller, at a substantially constant level during at least one of the following: the first state; the second state; the third state; or any combination thereof.

* * * * *